(12) United States Patent
Charland

(10) Patent No.: US 11,959,336 B2
(45) Date of Patent: Apr. 16, 2024

(54) DRILLING SYSTEM AND METHOD OF USING SAME

(71) Applicant: Luc Charland, Sherbrooke (CA)

(72) Inventor: Luc Charland, Sherbrooke (CA)

( * ) Notice: Subject to any disclaimer, the term of this patent is extended or adjusted under 35 U.S.C. 154(b) by 0 days.

(21) Appl. No.: 17/969,774

(22) Filed: Oct. 20, 2022

(65) Prior Publication Data

US 2023/0044315 A1 Feb. 9, 2023

Related U.S. Application Data

(63) Continuation of application No. 16/633,421, filed as application No. PCT/CA2018/050893 on Jul. 24, 2018, now Pat. No. 11,499,376.

(60) Provisional application No. 62/536,201, filed on Jul. 24, 2017.

(51) Int. Cl.
| | |
|---|---|
| *E21B 10/62* | (2006.01) |
| *E21B 3/00* | (2006.01) |
| *E21B 7/20* | (2006.01) |
| *E21B 10/32* | (2006.01) |
| *E21B 17/046* | (2006.01) |

(52) U.S. Cl.
CPC ............. *E21B 10/62* (2013.01); *E21B 3/00* (2013.01); *E21B 7/20* (2013.01); *E21B 10/32* (2013.01); *E21B 17/046* (2013.01)

(58) Field of Classification Search
CPC .......... E21B 10/32; E21B 10/56; E21B 10/62; E21B 17/046; E21B 3/00; E21B 7/20
See application file for complete search history.

(56) References Cited

U.S. PATENT DOCUMENTS

| | | |
|---|---|---|
| 5,284,216 A | 2/1994 | Brungs et al. |
| 7,143,847 B2 | 12/2006 | Giancarlo |
| 7,370,712 B2 | 5/2008 | Stout et al. |
| 7,410,015 B2 | 8/2008 | Denoix |

(Continued)

FOREIGN PATENT DOCUMENTS

| | | |
|---|---|---|
| CA | 2264492 A1 | 8/2000 |
| DE | 3423789 A1 | 1/1986 |

(Continued)

OTHER PUBLICATIONS

English summary of Final Office Action issued Sep. 26, 2022 in connection with Korean Patent Application No. 10-2020-7005368—7 pages.

(Continued)

*Primary Examiner* — Caroline N Butcher

(57) ABSTRACT

A drilling system having retractable wings and method of using same. The system includes at least one wing, which can extend from the system once it engages in a casing and abuts against an abutment ring at the bottom end of the casing. When the system starts drilling a hole into the ground, the casing is installed down the hole. In one configuration, the at least one wing is at least partially retracted into the drilling system and locked in this position. In another configuration, the at least one wing extends from the drilling system and locks into an extended position. The system can be connected to a down-the-hole hammer, a top-hammer drilling rod, or any other suitable rock drilling tool/apparatus, and can be used with a single and a dual rotary drilling tool/apparatus.

31 Claims, 34 Drawing Sheets

(56) References Cited

U.S. PATENT DOCUMENTS

| | | | |
|---|---|---|---|
| 7,681,671 B2 | 3/2010 | Lim | |
| 11,499,376 B2 | 11/2022 | Charland | |
| 2002/0139585 A1 | 10/2002 | Holte | |
| 2004/0182607 A1* | 9/2004 | Holte | E21B 4/14 175/57 |
| 2009/0188719 A1* | 7/2009 | Lim | E21B 7/20 175/57 |
| 2010/0155067 A1* | 6/2010 | Tunget | E21B 23/14 175/320 |
| 2010/0200303 A1* | 8/2010 | Mattila | E21B 10/62 175/389 |
| 2011/0180330 A1* | 7/2011 | Conn | E21B 10/32 175/406 |
| 2011/0240373 A1* | 10/2011 | Lyon | E21B 10/32 175/267 |
| 2011/0278069 A1* | 11/2011 | Ahonen | E21B 21/12 175/57 |
| 2018/0266186 A1 | 9/2018 | Burca et al. | |
| 2021/0131191 A1 | 5/2021 | Charland | |

FOREIGN PATENT DOCUMENTS

| | | | |
|---|---|---|---|
| EP | 3658741 A1 | 6/2020 | |
| JP | 24879296 A | 8/1996 | |
| JP | 1072994 A | 3/1998 | |
| JP | 2002285778 A | 10/2002 | |
| KR | 20030065052 A | 8/2003 | |
| KR | 20110023095 A | 3/2011 | |
| KR | 1020120118967 A | 10/2012 | |
| KR | 20140052629 A | 5/2014 | |
| KR | 20150110997 A | 10/2015 | |
| WO | 03004824 A1 | 1/2003 | |
| WO | 2004022904 A1 | 9/2004 | |
| WO | 2004088088 A1 | 10/2004 | |
| WO | 2006025713 A1 | 3/2006 | |
| WO | 2014027819 A1 | 2/2014 | |

OTHER PUBLICATIONS

Machine translation (English) of Japanese Patent Application No. JPH1072994—4 pp. 30-08—1996.

Machine translation (English) of Korean Patent Application No. KR20140052629—7 pages. Oct. 25, 2012.

Communication pursuant to Article 94(3) EPC issued on Feb. 20, 2023 in connection with EP Patent Application No. 18839373.0—6 pages.

Final Office Action dated Mar. 22, 2023 in connection with Korean Patent Application No. 10-2020-7005368—3 pages.

English Machine Translation of Final Office Action dated Mar. 22, 2023 in connection with Korean Patent Application No. 10-2020-7005368—4 pages.

Decision to Dismiss Amendment issued Mar. 22, 2023 in connection with Korean Patent Application No. 10-2020-7005368—2 pages.

English Machine Translation of Decision to Dismiss Amendment issued Mar. 22, 2023 in connection with Korean Patent Application No. 10-2020-7005368—3 pages.

Search Report dated Nov. 2, 2018 in connection with PCT/CA2018/050893—3 pages.

Written Opinion dated Nov. 2, 2018 in connection with PCT/CA2018/050893—3 pages.

Extended European Search Report dated Feb. 18, 2021 in connection with EP 18839373.0—7 pages.

Non-final Office Action dated Mar. 31, 2021 in connection with U.S. Appl. No. 16/633,421—9 pages.

Final Office Action dated Oct. 12, 2021 in connection with U.S. Appl. No. 16/633,421—8 pages.

Advisory Action dated Nov. 16, 2021 in connection with U.S. Appl. No. 16/633,421—5 pages.

Invitation pursuant to Rule 137(4) EPC and Article 94(3) EPC issued Nov. 24, 2021 in connection with EP 18839373.0—3 pages.

Office Action dated Dec. 21, 2021 in connection with KR 10-2020-7005368 (with EN translation)—6 pages.

Non-Final Office Action dated Feb. 16, 2022 in connection with U.S. Appl. No. 16/633,421—9 pages.

Notice of Allowance dated Jul. 14, 2022 in connection with U.S. Appl. No. 16/633,421—8 pages.

Final Office Action dated Sep. 26, 2022 in connection with Korean Patent Application No. 10-2020-7005368—7 pages.

Final Office Action dated Jul. 26, 2023 in connection with Korean Patent Application No. 10-2020-7005368 (with English translation)—7 pages.

* cited by examiner

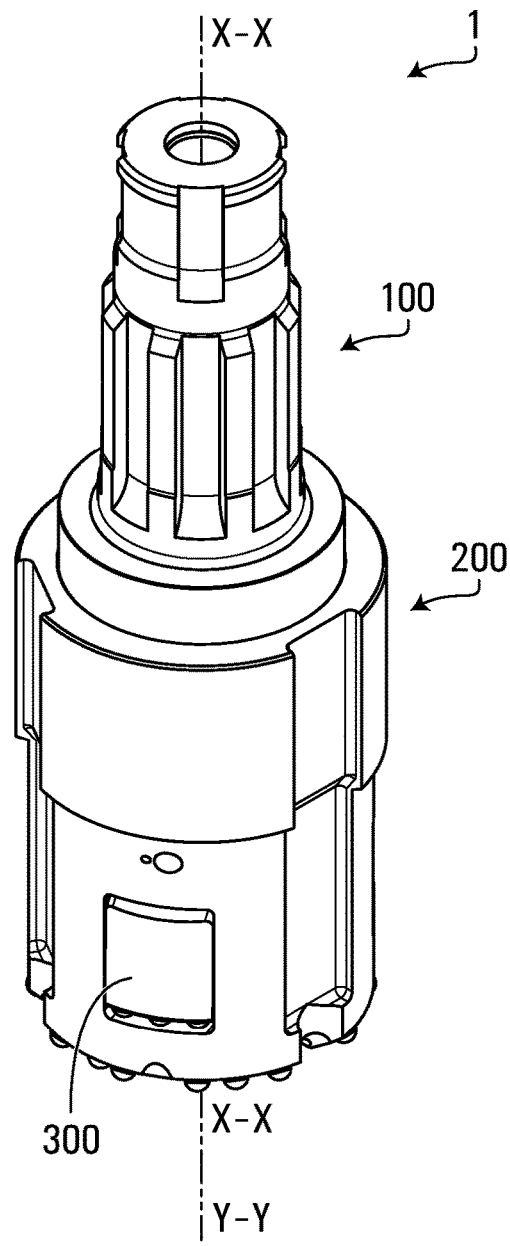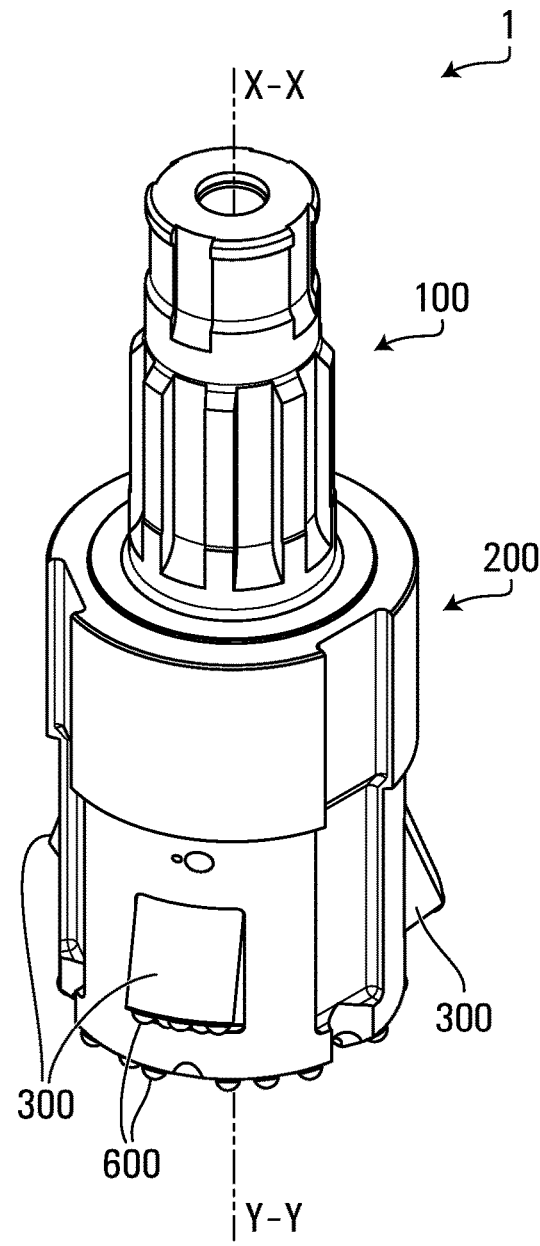
FIG. 2  FIG. 3

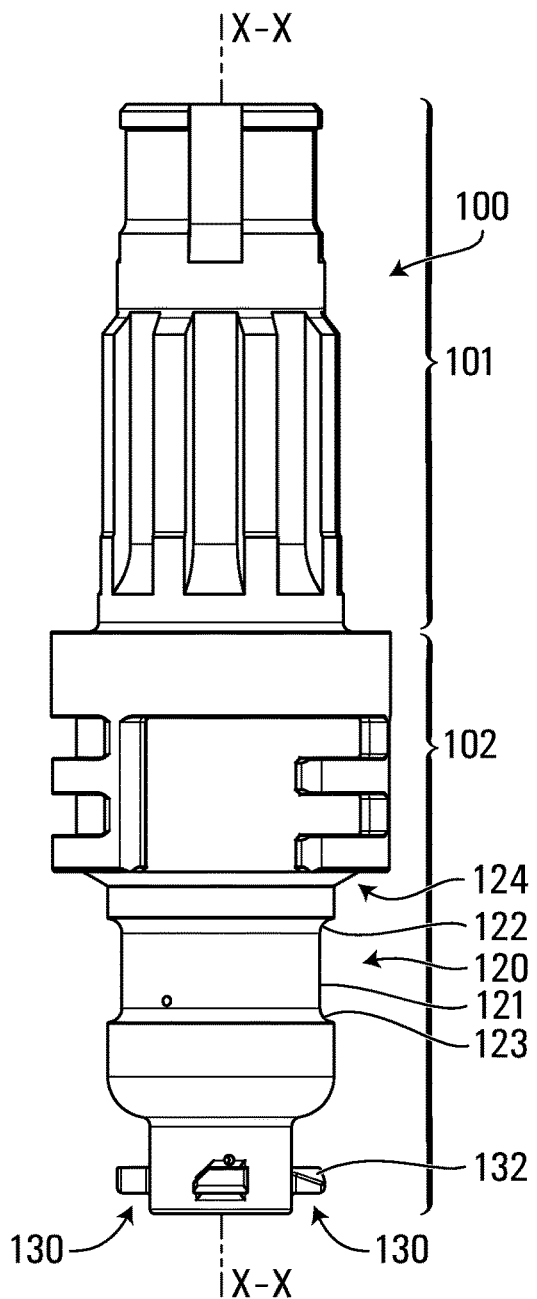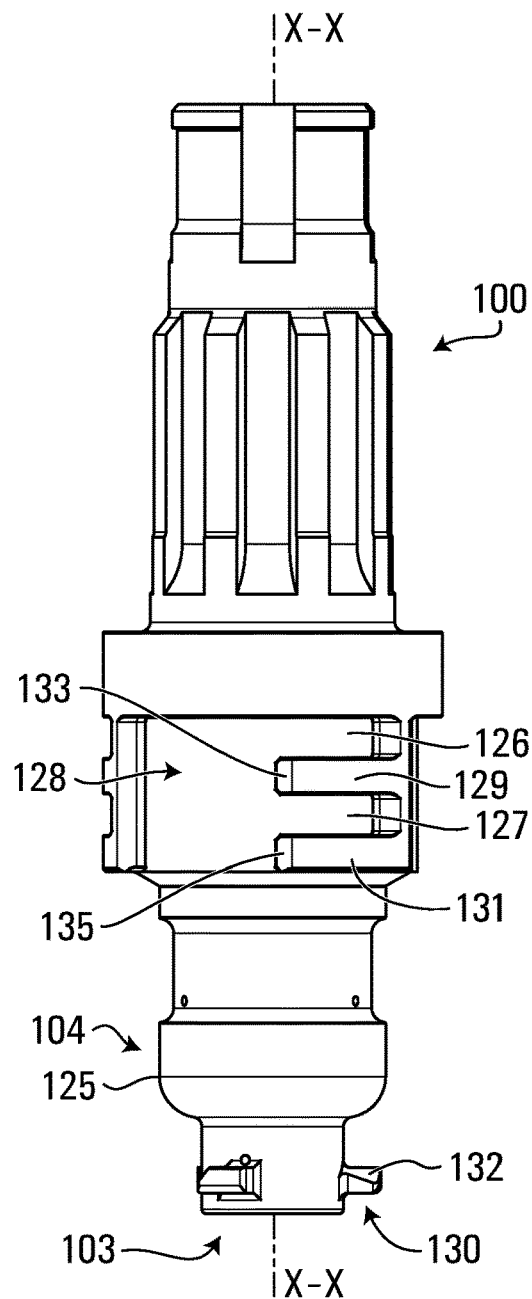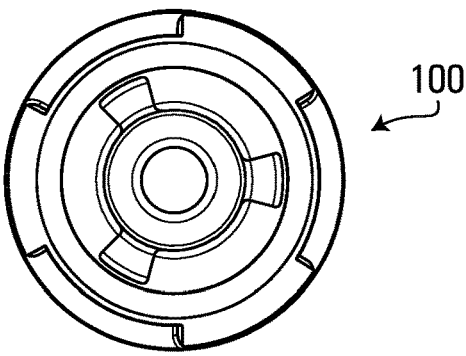
FIG. 5     FIG. 6
FIG. 7

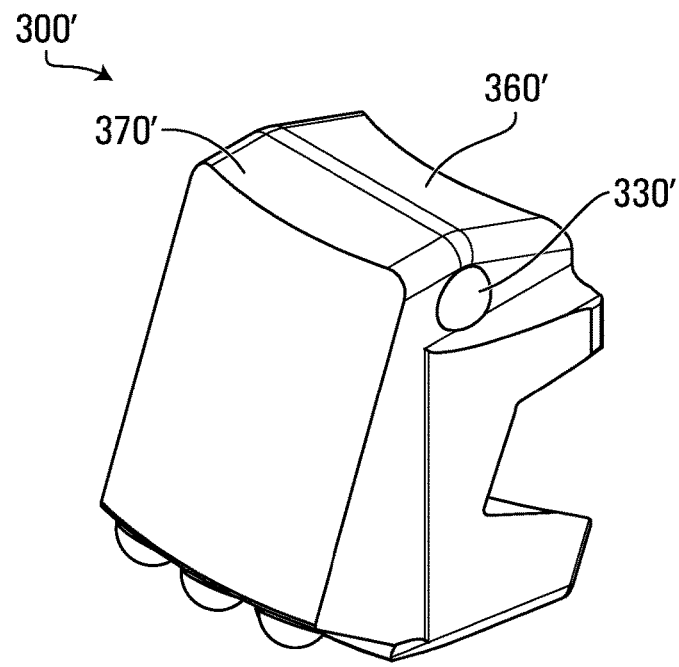
FIG. 44
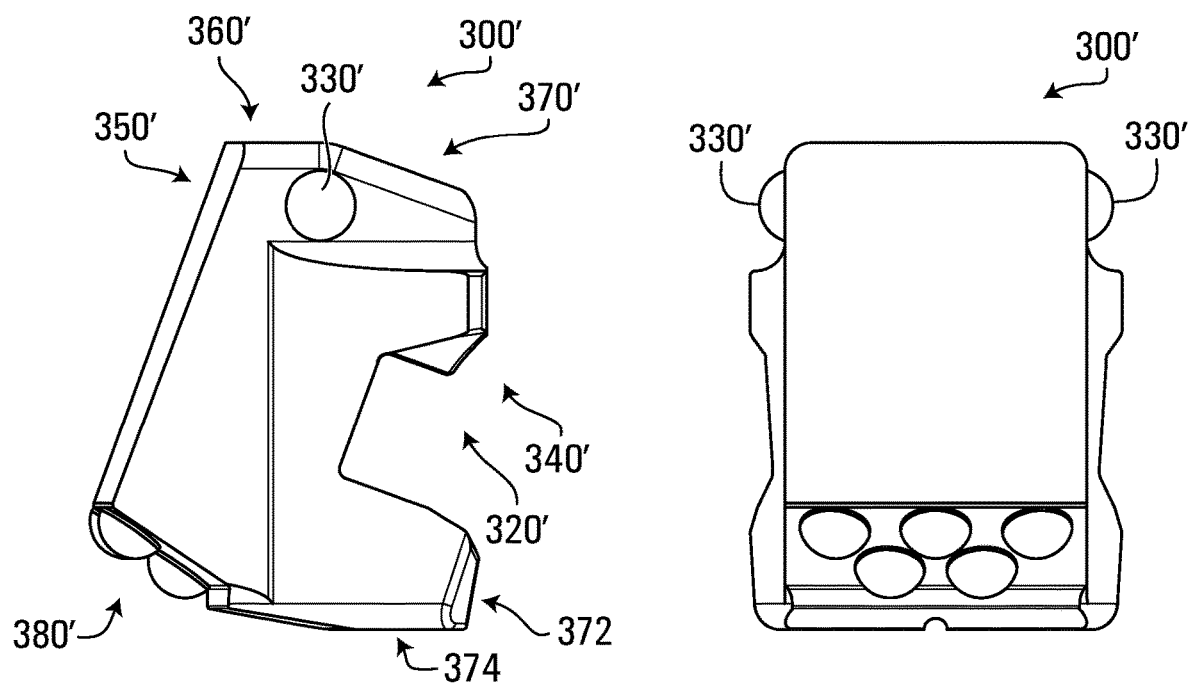
FIG. 45  FIG. 46

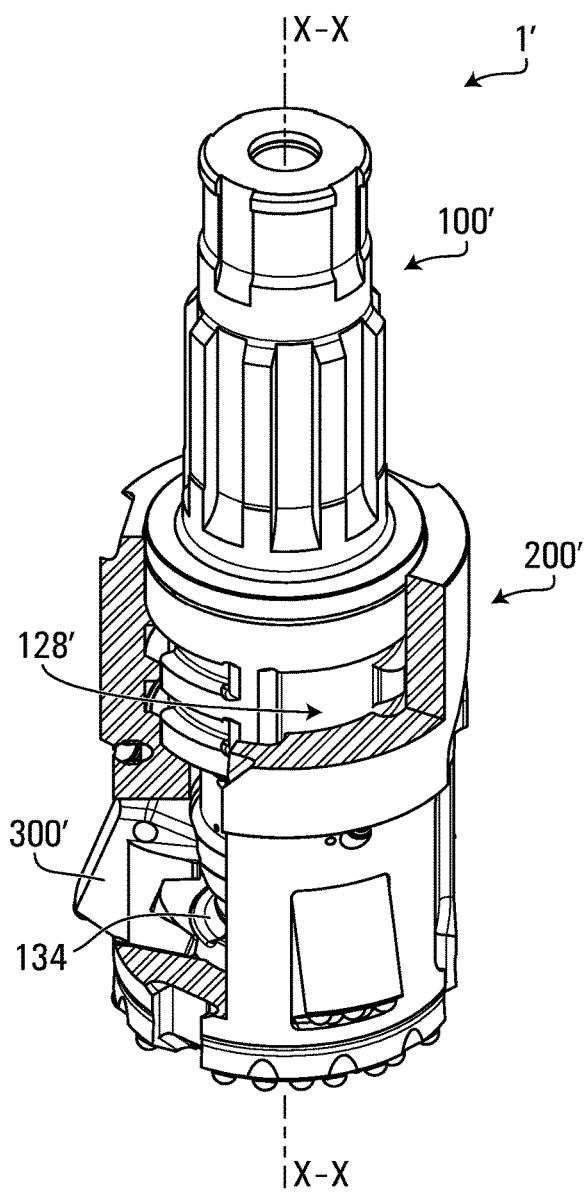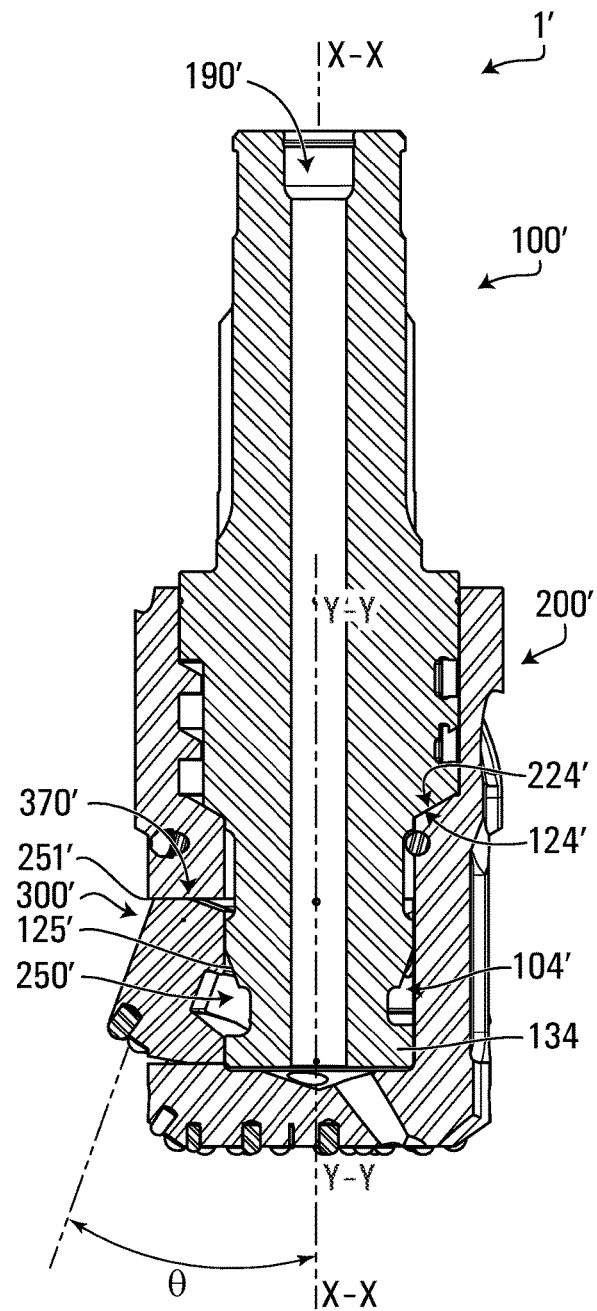
FIG. 51  FIG. 52

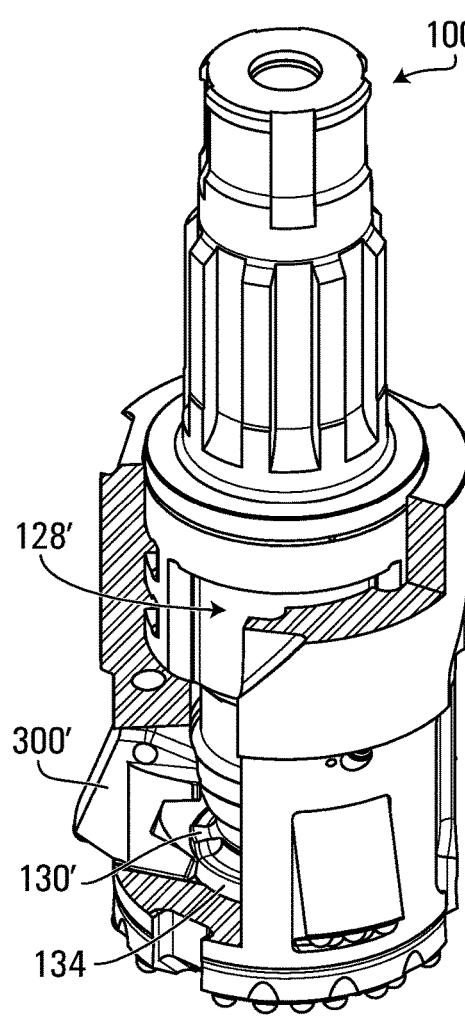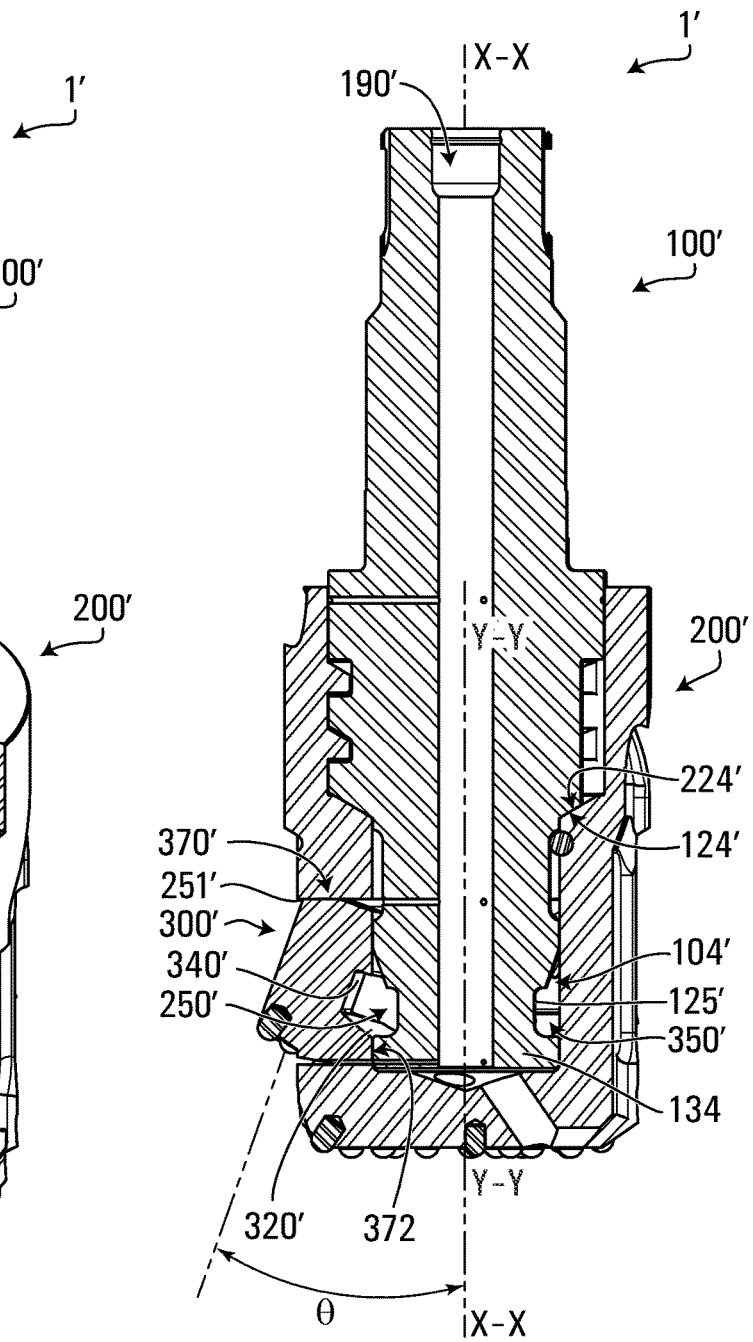
FIG. 53   FIG. 54

DRILLING SYSTEM AND METHOD OF USING SAME

CROSS-REFERENCE TO RELATED APPLICATIONS

This patent application is a continuation of presently allowed U.S. patent application Ser. No. 16/633,421 filed Jul. 24, 2018, which itself claims priority from U.S. Provisional Patent Application No. 62/536,201 filed on Jul. 24, 2017 and the contents of the aforementioned documents incorporated herein by reference.

TECHNICAL FIELD

The present disclosure generally relates to drilling holes in the ground, and more particularly to drilling systems, apparatus, and method of using same for drilling holes in the ground.

BACKGROUND

Ground drilling has been performed for decades, and apparatus, systems, devices, and means for performing such drilling have progressively evolved. Ground drilling systems find a use in many fields. For instance, ground drilling is used for installing geothermal systems casing; fluid (e.g. water) conduits; underground casings; rock or ground anchors for stabilizing or solidifying structures and buildings; drilled piles and micro-piles; and industrial wells for exploiting underground natural resources (e.g. natural gas, petroleum). Many types of systems and methods adapted for each of these different purposes exist in the industry.

As noted above, one aspect of performing ground drilling is to install casing or piping in the ground, for a number of reasons. A particular technique used in ground drilling is often referred to as casing drilling (also called down-the-hole drilling and/or overburden drilling and/or overburden casing systems, and/or casing advancement system). The systems used for performing this type of drilling operation are configured generally to generate repetitive impacts (percussive systems) together with rotary action for crushing and drilling the ground as the drill guide device is driven down the hole. In short, the operation allows drilling a hole in rock, overburden, or other types of ground, and simultaneously driving down a casing (or piping) as the hole is being drilled. After drilling the hole, the entire drilling system can be pulled out of the hole, hence leaving in place the casing. This technique substantially increases time efficiency (and thus reduces operation costs) since both the hole drilling and casing placement are performed in one single operation.

Existing systems for performing ground drilling have deficiencies, which the present invention aims to address at least in part.

SUMMARY

According to various aspects of this disclosure, there is provided a drilling system for drilling a hole into the ground, while installing a casing down the hole. The drilling system is an expandable drilling system that can drill various bore sizes and that can be operated with a single and a dual rotary drilling apparatus. The drilling system can be used as a drilling device for drilling inside a casing, outside a casing or without a casing. The drilling system can be used as a drill bit and can transform into an under reamer during its operation. The drilling system can adapt to various types of ground, including rock, overburden or a combination thereof. The drilling system comprises few moveable parts and can easily be dismantled to replace parts or for maintenance purposes.

For example, in accordance with an aspect of this disclosure, there is provided a drilling system that comprises a driver, a guide device comprising at least one retractable wing and a retention system for retaining the driver in the guide device. The driver being movable generally along a longitudinal axis of the drilling system between a first axial position wherein the at least one wing is in a retracted position and a second axial position wherein the at least one wing is in an extended position. The driver in the first axial position is mechanically lockable, so that the at least one wing is constrained in the retracted position.

In accordance with another aspect of this disclosure, there is provided a drilling system that comprises a driver, a guide device comprising at least one wing pivotally retractable, a retention system for retaining the driver in the guide device, and a locking mechanism for locking the at least one wing in a retracted position or an extended position.

In accordance with another aspect of this disclosure, there is provided a set of wings for a drilling system. The set of wings comprises at least one wing, the at least one wing comprising a pair of pivot nipples. The drilling system comprises a driver and a guide device, the guide device being configured to receive the pair of pivot nipples of each of the at least one wing of the set of wings.

In accordance with another aspect of this disclosure, there is provided a method for using a drilling system in accordance with the present disclosure.

In accordance with another aspect of this disclosure, there is provided a drilling system to drill a hole in the ground. The drilling system comprises: a first member; a second member; and a retention system. The retention system comprises a connection to connect the first member and the second member, the connection comprising a first locked position wherein the retention system retains the first member and the second member from substantially moving relative to one another in axial directions of the drilling system and in a first rotational direction of the drilling system, and wherein the first member and the second member can move relative to one another in a second rotational direction of the drilling system to disengage from the first locked position In accordance with another aspect of this disclosure, there is provided a drilling system to drill a hole in the ground. The drilling system comprises: a first member; a second member; and a retention system. The retention system comprises a connection to connect the first member and the second member, the connection comprising a locked position wherein the retention system retains the first member and the second member from substantially moving relative to one another in axial directions of the drilling system and in a first rotational direction of the drilling system, and wherein the first member and the second member can move relative to one another in a second rotational direction of the drilling system to disengage from the locked position. The drilling system comprises a retractable wing.

In accordance with another aspect of this disclosure, there is provided a drilling system to drill a hole in the ground. The drilling system comprises: a driver for connection to a drilling rod configured to impart drilling action to the driver; a guide device; at least one wing mounted to the guide device, the at least one wing capable to acquire an extended position to configure the drilling system to drill an extended diameter bore and a retracted position to configure the drilling system to drill a reduced diameter bore; the driver configured to engage the guide device in a selected one of plurality of engagement positions, including a first engagement position in which the at least one wing is in the extended position and a second engagement position in which the at least one wing is in the retracted position; in either one of the first and second engagement positions the driver configured to communicate the drilling action imparted by the drilling rod to the guide device to drill a bore of a selected one of the extended or retracted diameter.

These and other aspects of this disclosure will now become apparent to those of ordinary skill in the art upon review of the following description of embodiments in conjunction with the accompanying drawings.

BRIEF DESCRIPTION OF THE DRAWINGS

A detailed description of non-limiting examples of implementation of the present invention is provided hereinbelow with reference to the following drawings, in which:

FIG. 2 is a perspective view of the drilling system shown in FIG. 1, shown in a first configuration in which the wings are retracted in order to drill a small diameter hole;

FIG. 3 is a perspective view of the drilling system shown in FIG. 1, shown in a second configuration in which the wings are expanded to drill a large diameter hole;

FIG. 5 is a side elevational view of the driver of FIG. 4;

FIG. 6 is a side elevational view of the driver of FIG. 4 but in a different angular orientation than the one of FIG. 5;

FIG. 7 is a bottom elevational view of the driver of FIGS. 4, 5 and 6;

FIG. 8 illustrates the retention system for securing the driver to the guide device which comprises a series of retaining pins;

FIG. 44 shows a perspective view of a another example of implementation of a wing according to the present invention, as shown in the drilling system of FIG. 39;

FIG. 45 shows a side elevational view of the wing shown in FIG. 44;

FIG. 46 shows a front elevational view of the wing shown in FIG. 44;

FIG. 51 shows a perspective view of the drilling system shown in FIG. 39, the view being partly cut away to show features of the driver, the guide device and the wings of the drilling system, which is shown in a configuration in which the wings are in an extended position and unlocked;

FIG. 52 shows a sectional view of the drilling system taken along line X-X of FIG. 51;

FIG. 53 shows a perspective view of the drilling system shown in FIG. 39, the view being partly cut away to show features of the driver, the guide device and the wings of the drilling system, which is shown in a configuration in which the wings are locked in an extended position;

FIG. 54 shows a sectional view of the drilling system taken along line X-X of FIG. 53;

Figure 1:
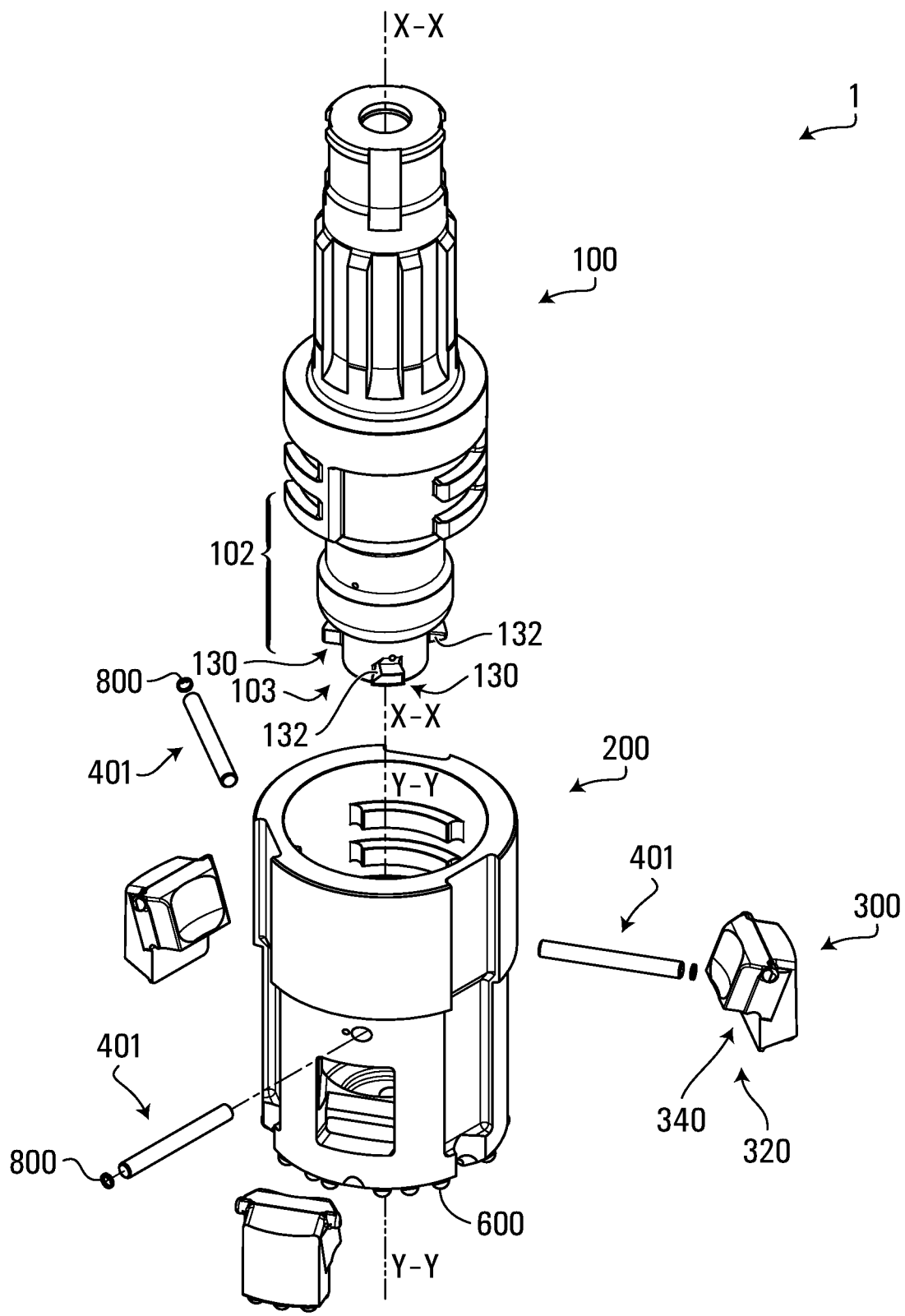
FIG. 1 shows an exploded view of an example of implementation of the drilling system according to the invention.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION OF EMBODIMENTS

To facilitate the description, any reference numeral designating an element in one figure will designate the same element if used in any other figure. In describing the embodiments, specific terminology is used but the invention is not intended to be limited to the specific terms so selected.

The present invention pertains to a drilling system which can be used notably with DTH (down the hole) hammer or top hammer drilling rod known in the art. A detailed description of the structure and operation of a DTH hammer or top hammer drilling rod is not necessary for understanding the present invention. Suffice it to say that the drilling rod is capable of hammering action, which is imparted to the drilling system in order to produce a hole by breaking rock or other material. The drilling rod is also capable of rotation, which in combination with the hammering action indexes the drilling system to progressively disintegrate the rock. Finally, the drilling rod can also be longitudinally displaced in order to advance or retract the drilling system in the hole being drilled.

The drilling system of the present invention may be used to drill down a hole in the ground and install a casing in the hole. After drilling the hole and installing the casing in said hole, the drilling system can be pulled out of the hole, leaving the casing in place. In a broad example of implementation, this technique can be implemented with the drilling system of the present invention in the following manner. The drilling system may be engaged in a casing which will be driven down a hole. While the drilling system is displacing within said casing, the bore size of the drilling system is smaller than an interior diameter of said casing. After the drilling system reaches a bottom end of said casing, the bore size of the drilling system can be selectively and momentarily expanded such that the bore size may become slightly larger than an exterior diameter of said casing. Thus, as the drilling system progressively drills a hole, said casing may be driven down the hole.

FIGS. 1 to 3 show an example of a drilling system 1 in accordance with an embodiment of the present invention. In this embodiment, the drilling system 1 includes a driver 100 which is configured so as to connect at an upper end 2 thereof to a DTH hammer (not shown) or any other suitable rock drilling tool/apparatus (e.g., a drilling rod); a guide device 200 which is configured for receiving/engaging the driver 100; at least one wing 300 configured for engaging the guide device 200; and a retention system 400 for retaining the driver 100 into the guide device 200 once the driver 100 is engaged therein. In this example, the drilling system 1 includes three wings 300 configured for pivotally engaging the guide device 200 and the retention system 400 includes three retaining pins 401 for retaining the driver 100 into the guide device 200. In other variants, the reader will readily understand that the retention system 400 may include any number of retaining pins 401 and/or any other suitable retention components. Also, in other variants, the drilling system 1 may include any number of wings 300. As further discussed later with more details, in one example of operation, the drilling system 1 may be used for drilling a hole and simultaneously driving down a casing in the hole.

The configuration of the driver 100 in accordance with the present invention may take any suitable form. Different aspects of an example of implementation of the driver 100 in accordance with the present invention and interactions between the driver 100 and other parts of the drilling system 1 shown in FIGS. 1 to 3 will now be described. More details specific to other parts of a drilling system 1 in accordance with the present invention will be discussed later.

The driver 100 may have a generally circular geometry including diameter variations, protrusions, and grooves or slots machined on its outer surface. FIGS. 4 to 7 show an example of the driver 100 in accordance with the present invention. In this embodiment, the driver 100 has an upper section 101, which connects to a DTH hammer or top hammer drill rod (not shown), and a lower section 102, which engages the guide device 200. The upper section 101 includes a series of splines which allow the DTH hammer to impart rotational motion to the driver 100 and also allow a limited range of axial movement between the driver 100 and the DTH hammer to permit the hammering action.

The driver 100 includes a bayonet connection at the upper portion of the lower section 102. The bayonet connection allows connecting the driver 100 with the guide device 200 as a result of the driver 100 being pushed into the guide device 200 and then twisted to lock the driver 100 to the guide device 200. The bayonet connection includes interfitting features on both the driver 100 and the guide device 200, which mate with one another to allow the connection to be realized. On the driver 100 the bayonet connection includes at least one recessed portion 128 that has two vertically spaced apart slots 126 and 127, defined between arcuate projections 129, 131, each shaped as a segment of a circle. The free extremities of the projections 129 and 131 have camming surfaces 133, 135 to facilitate engagement with the corresponding features in the guide device 200. Alternatively or additionally, in other embodiments, the at least one recessed portion 128 may include more than two vertically spaced apart slots.

The bayonet connection is configured to allow the driver 100 to be locked to the guide device 200 in two different axial positions. In a first of those positions, the driver 100 projects further from the guide device 200 than in the second position. That is, in the second position, the driver 100 is positioned deeper within the guide device 200 than in the first position. The two locking positions are achievable as a result of the presence of multiple slots in the driver 200, which define two, or possibly more engagement options. For instance, in some embodiments, the bayonet connection may be configured to allow the driver 100 to be locked to the guide device 200 in more than two different axial positions. A particular engagement option can be achieved by positioning the driver 100 in a selected axial position with relation to the guide device 200 and then performing a twisting movement to lock the components together.

Since an axial movement is necessary between the driver 100 and the guide device 200 to achieve the desired engagement option, a retention system is provided in order to avoid the driver 100 from being fully pulled out of the guide device 200. The retention system is designed to allow a range of axial movement between the driver 100 and the guide device 200 that is sufficient to permit two or more engagement options. However, the retention system does not allow the driver 100 to axially move with relation to the guide device 200 outside of the range of movement. A practical advantage is to design the retention system such that the end most engagement option generally coincides with the end of travel allowed by the retention system. This allows the operator to remotely displace the driver 100 axially until it abuts the end of travel position, where the slots and corresponding projections are in alignment with each other. A twisting motion then suffices to mesh the slots and the projections.

The axial movement between the driver 100 and the guide device 200 permits to actuate the wings 300 engaged in the guide device 200, such that the wings 300 can progressively move between a retracted position and an extended position (or vice versa). The axial movement of the driver 100 relative to the guide 200 in both a downward and an upward direction allows to control the movement of the wings 300. For instance, in this embodiment, upon axially moving the driver 100 downwardly (i.e. deeper) within the guide device 200, the wings 300 progressively spread out of the guide device 200 to increase the total bore size of the drilling system 1. Upon axially moving the driver 100 upwardly within the guide device 200, the wings 300 may progressively retract inside the guide device 200. In this embodiment, the wings 300 progressively pivot between a retracted position and an extended position (or vice versa), such that when the wings 300 are in an extended position, the total bore size of the drilling system 1 is increased, and when the wings 300 are in a retracted position, the total bore size of the drilling system 1 is decreased. In other embodiments, the wings 300 may extend and retract from the guide device 200 with a motion that is other than a pivotal motion, such as translational motion.

A practical advantage of a drilling system 1 capable of adopting different bore sizes, for instance two or more different bore sizes, is that it may allow to vary the inner diameter of a hole along a longitudinal direction thereof and/or it may allow to drill consecutive holes with different diameters, thus providing greater flexibility in use. Additionally or alternatively, a drilling system 1 capable of having various bore sizes may, for instance, engage a restricted space (e.g. tunnel, hole, piping, tubing, casing, or other restricted passages), and then expand/deploy for increasing its total bore size when the restricted space has been cleared. A practical example of operation of the drilling system 1 implementing the above principle will be described later.

To achieve such control of the pivotal movement of the wings 300, a lower portion of the lower section 102 of the driver 100 is configured to slidably cooperate with the wings 300. More particularly, the driver 100 includes an enlargement 104 at the lower portion of the lower section 102 that includes a guiding surface 125 configured to slidingly engage a rear surface 350 of the wings 300. The guiding surface 125 has a cam profile defining a spherical geometry. In this embodiment, the guiding surface 125 extends longitudinally along the longitudinal axis X-X of the driver 100 and tapers toward the centerline at the lower extremity of the enlargement 104, such that the diameter of the enlargement 104 decreases progressively towards the bottom end 103 of the driver 100. By axially moving the driver 100 within the guide device 200, the guiding surface 125 slidingly engages the rear surface 350 of the wings 300, as will be illustrated in following figures. Since the guiding surface 125 tapers, when the enlargement 104 moves downwardly, i.e. towards the bottom end of the guide device 200, the guiding surface 125 engages and progressively drives the wings 300 out through apertures 250 in the guide device 200. When the enlargement 104 moves upwardly, i.e. towards the upper end of the guide device 200, the enlargement 104 moves out of engagement with the wings 300, allowing the wings 300 to retract inside the apertures 250 of the guide device 200.

The drilling system 1 may be selectively configured to drill a hole in one or more drilling configurations. In this embodiment, in a first drilling configuration, the wings 300 are pivotally retracted in the guide device 200 as a result of the driver 100 being positioned in the first axial position. In a second drilling configuration, the wings 300 are pivotally extended from the guide device 200 as a result of the driver 100 being positioned in the second axial position within the guide device 200.

The drilling system 1 may also be configured to lock the wings 300 in an extended position and/or in a retracted position. A practical advantage of being able to lock the wings 300 in a retracted position is, notably, that it allows the drilling system 1 to rotate while longitudinally displacing within a casing in order to clean the interior of said casing, or for any other purposes, without risking to jam the wings 300 in the interior of said casing, for instance as a result of the wings 300 deploying due to centrifugal force or mechanical engagement while the drilling system 1 resides within and/or passes through the casing. Also, a practical advantage of being able to lock the wings 300 in an extended position is, notably, that the drilling system 1 may be used to pull a casing out from a hole having been drilled. These two different axial positions will be further described later and illustrated in following figures.

The driver 100 includes, at a lowermost portion of the lower section 102 (i.e. proximate a lower end 103 of the driver 100), radial projections 130 configured to interact with a notch 340 formed at an inner surface 320 of each of the wings 300, all of which defining a locking mechanism for locking the wings 300 in the retracted position. The radial projections 130 include a camming surface 132 to facilitate rotatable engagement of a radial projection 130 in a notch 340 of a wing 300. In this embodiment, the locking mechanism on the driver 100 includes three radial projections 130, each of which being configured to register in a corresponding notch 340 on each one of the three wings 300. It is to be understood that in other embodiments where there may be more than or less than three wings 300, the wing retaining mechanism on the driver 100 may include more than or less than three radial projections 130, each of which for interacting with a corresponding wing 300. The operation of the locking mechanism will be described in more details later.

Figure 8:
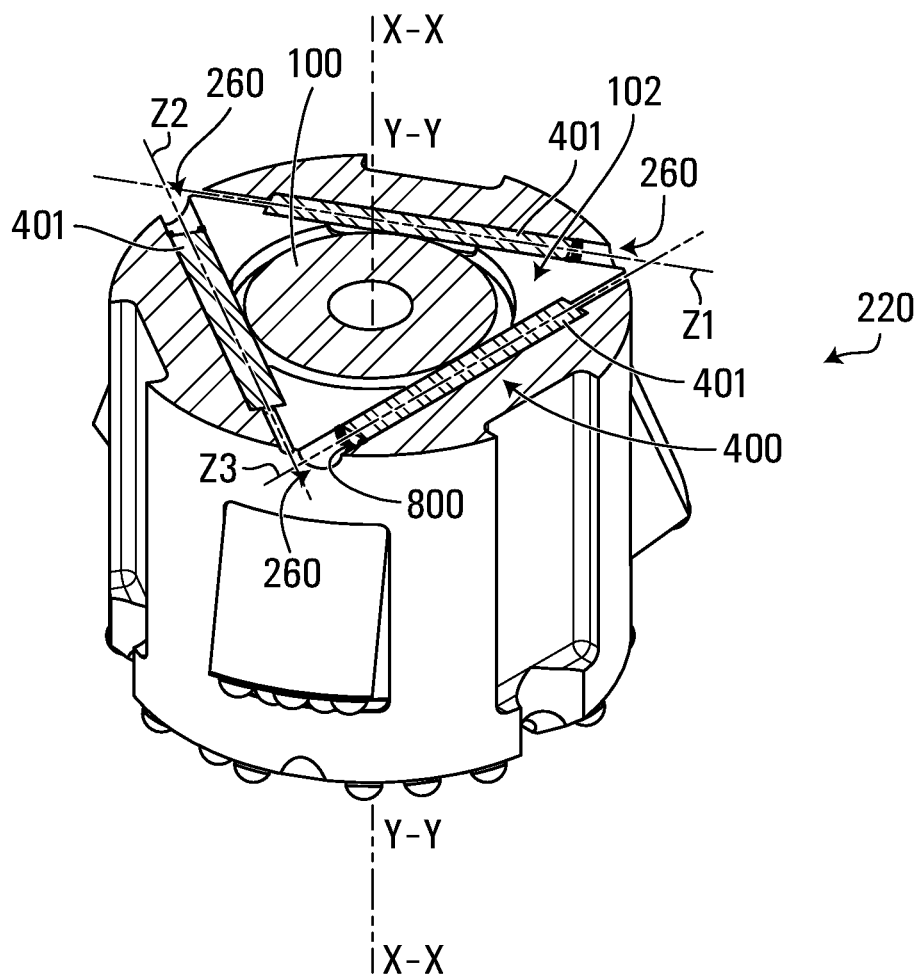
FIG. 8 is a cross-sectional view of the driver of FIGS. 4 to 7, shown engaged in a guide device, the cross-section being taken in a horizontal plane which is perpendicular to the longitudinal axis of the driver.
Figure 10:
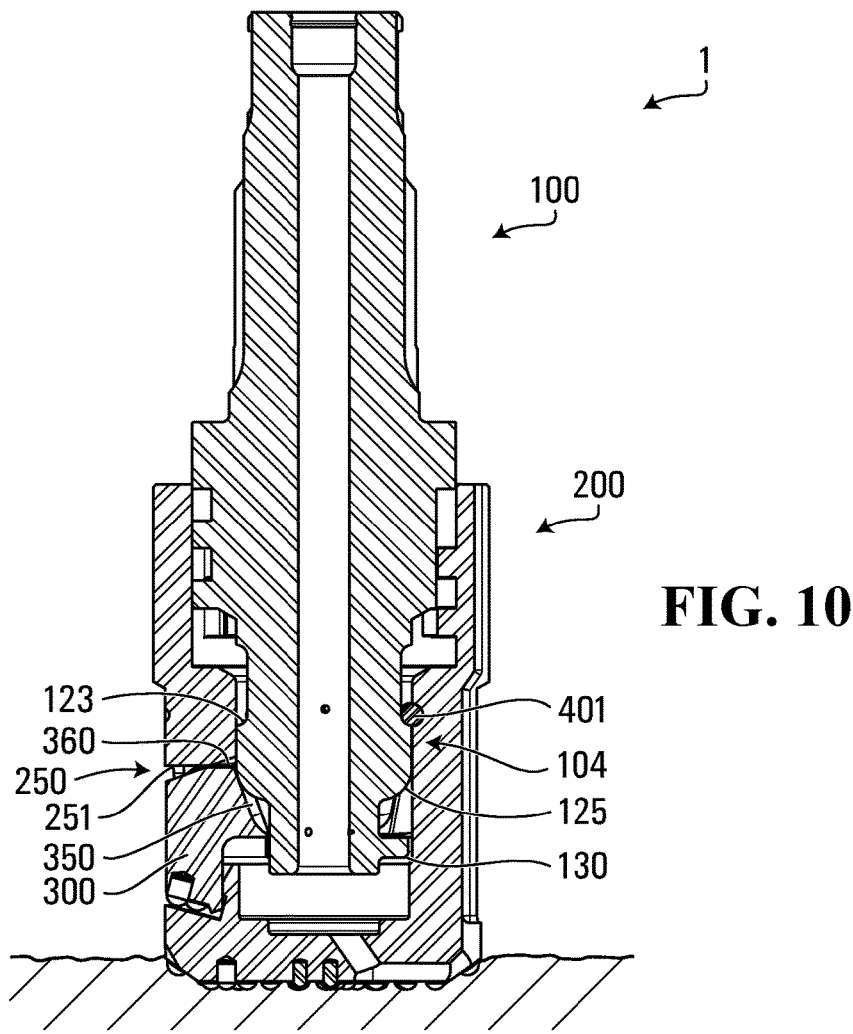
FIG. 10 is a sectional view taken along lines B-B in FIG. 9.
Figure 9:
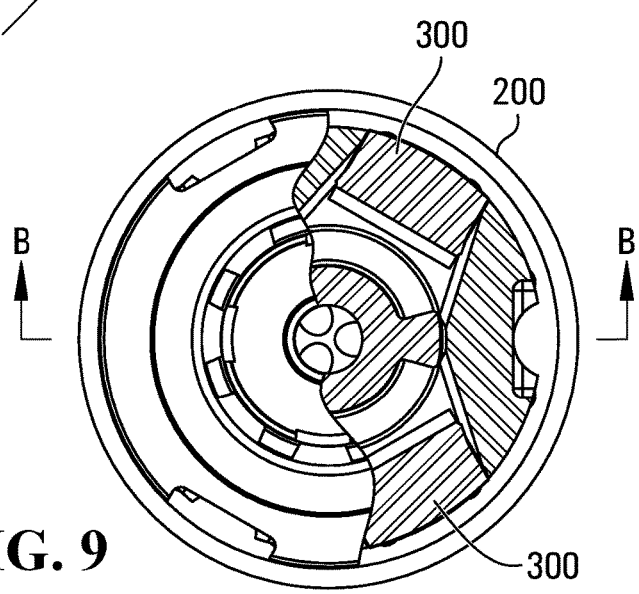
FIG. 9 is a top elevational view of the driver and guide device assembly of the drilling system shown in FIG. 1, the view being partly cut away to illustrate certain construction details, the driver being shown in a configuration in which the wings are retracted and unlocked.
Figure 12:
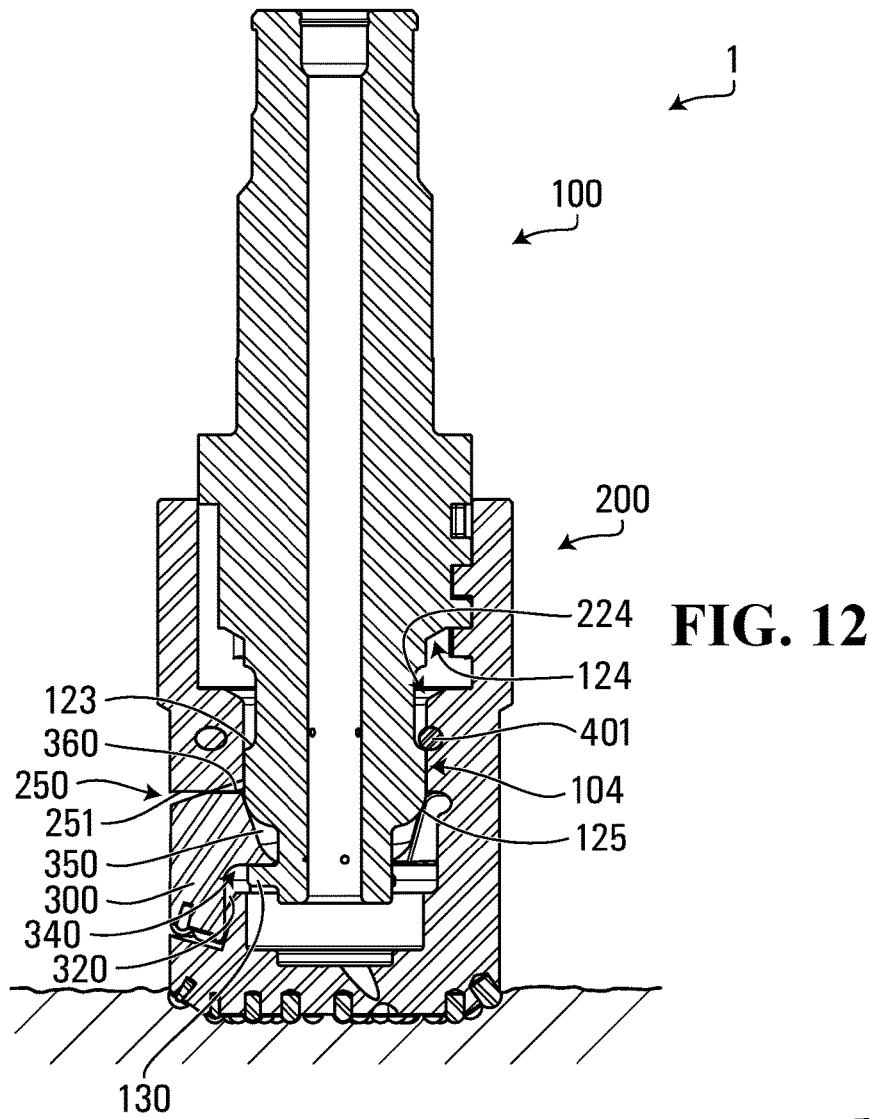
FIG. 12 is a sectional view taken along lines A-A in FIG. 11.
Figure 11:
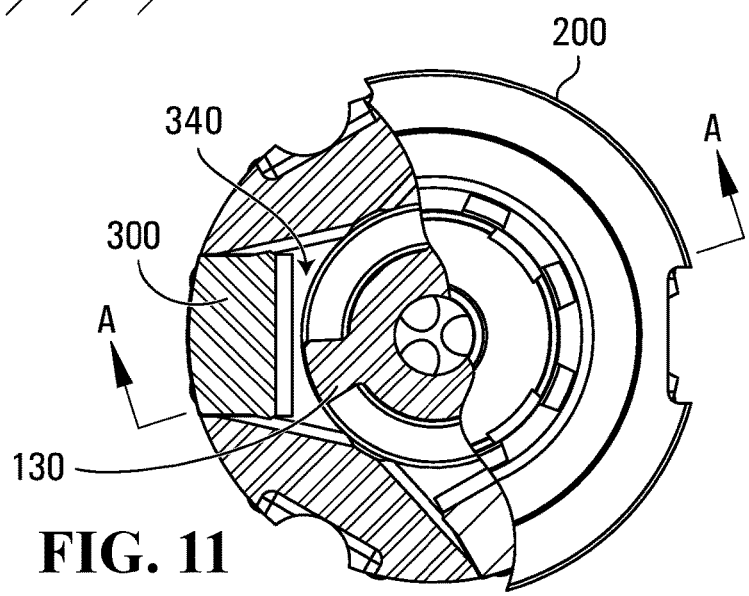
FIG. 11 is a top elevational view of the driver and guide device assembly of the drilling system shown in FIG. 1, the view being partly cut away to illustrate certain construction details, the driver being shown in a configuration in which the wings are retracted and locked.
Figure 14:
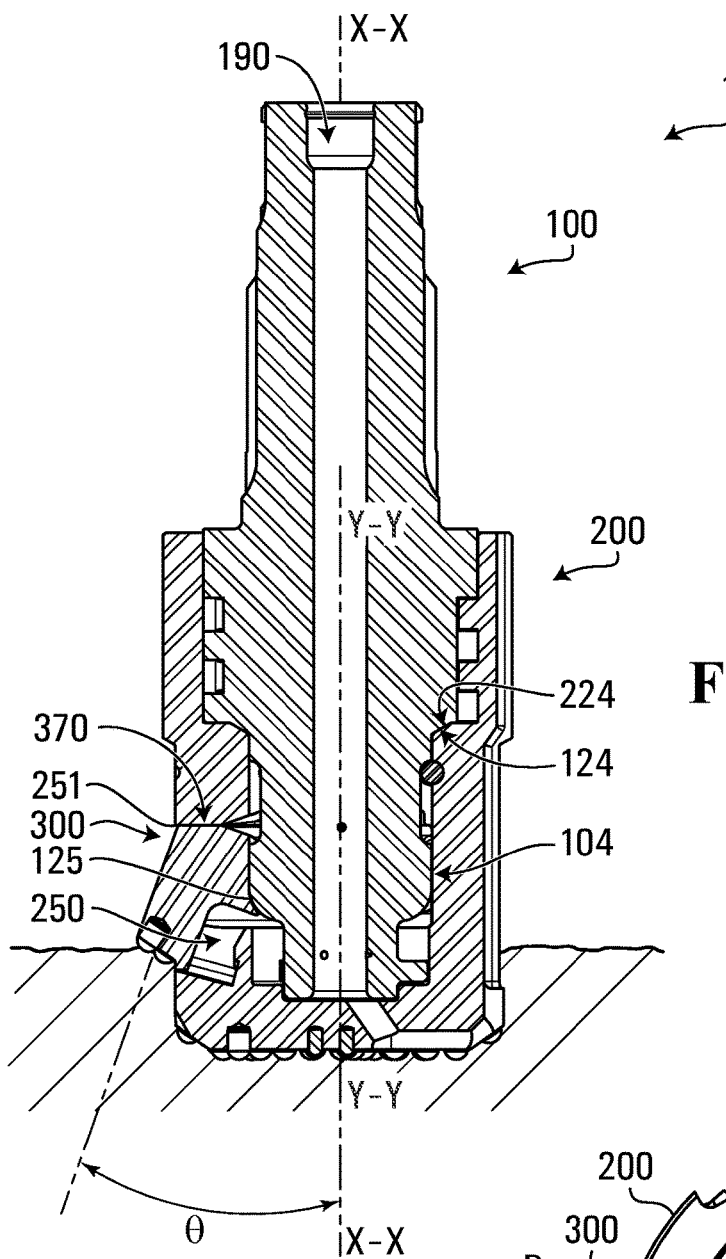
FIG. 14 is a sectional view taken along lines D-D in FIG. 13.
Figure 13:
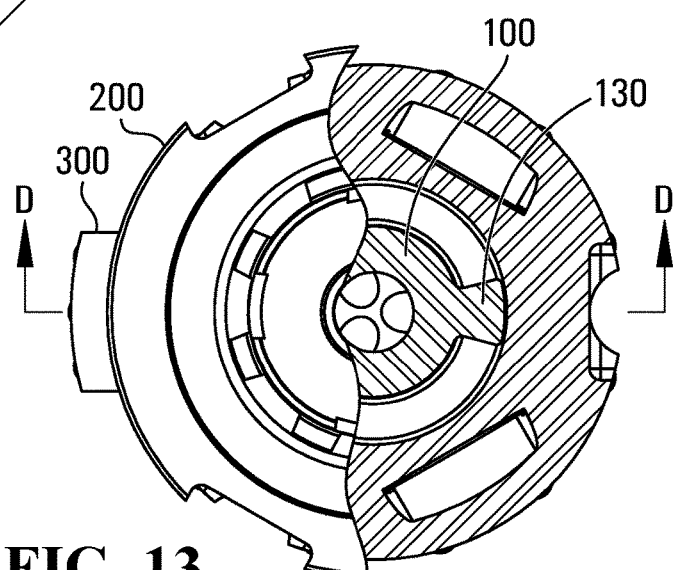
FIG. 13 is a top elevational view of the driver and guide device assembly of the drilling system shown in FIG. 1, the view being partly cut away to illustrate certain construction details, the driver being shown in a configuration in which the wings are extended and unlocked.
Figure 16:
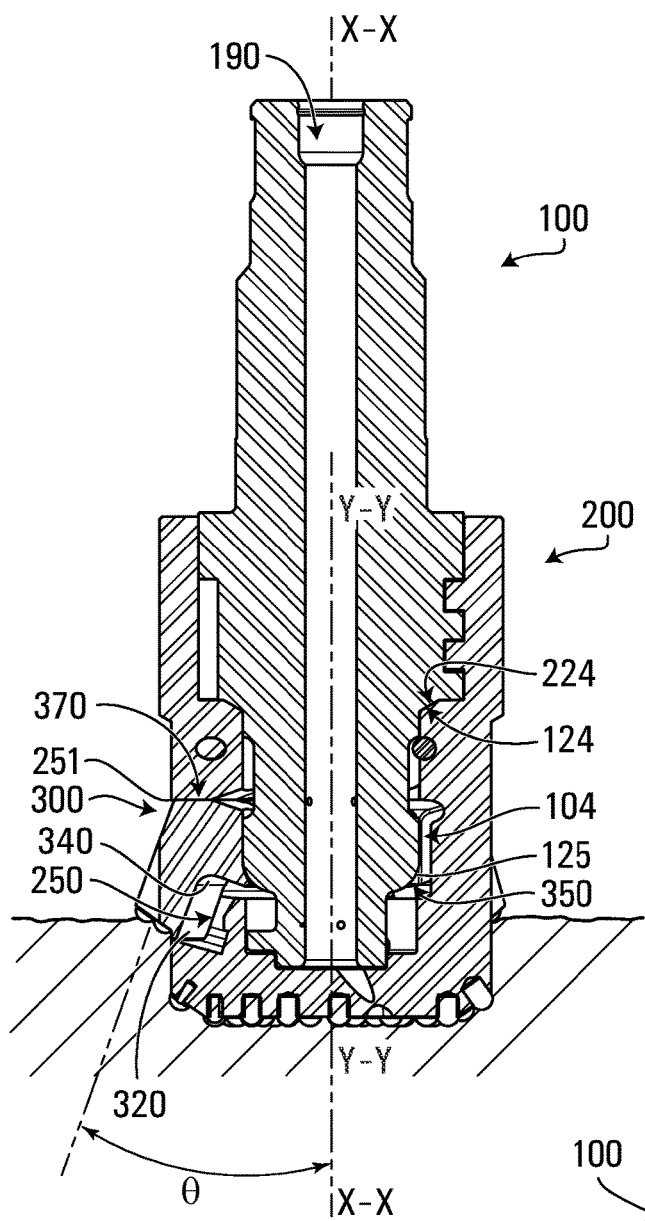
FIG. 16 is a sectional view of the driver and guide device assembly taken along lines C-C in FIG. 15.
Figure 15:
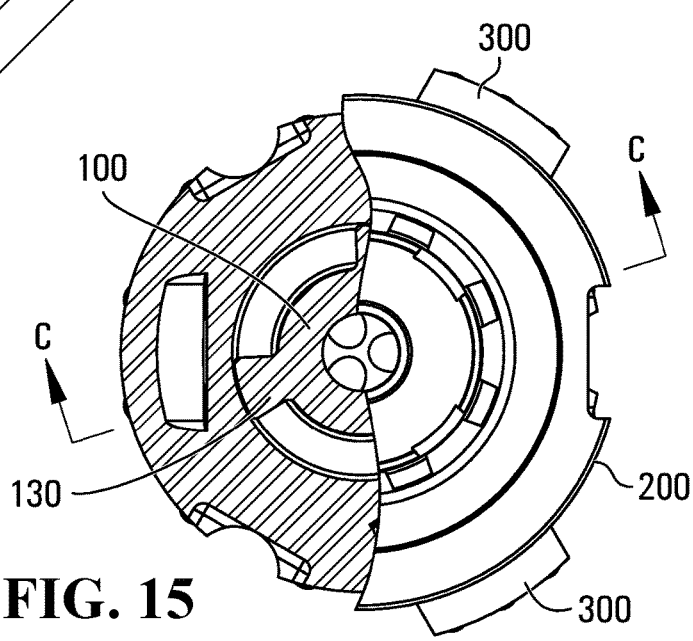
FIG. 15 is a top elevational view of the driver and guide device assembly of the drilling system shown in FIG. 1, the view being partly cut away to illustrate certain construction details, the driver being shown in a configuration in which the wings are extended and locked.
Figure 17:
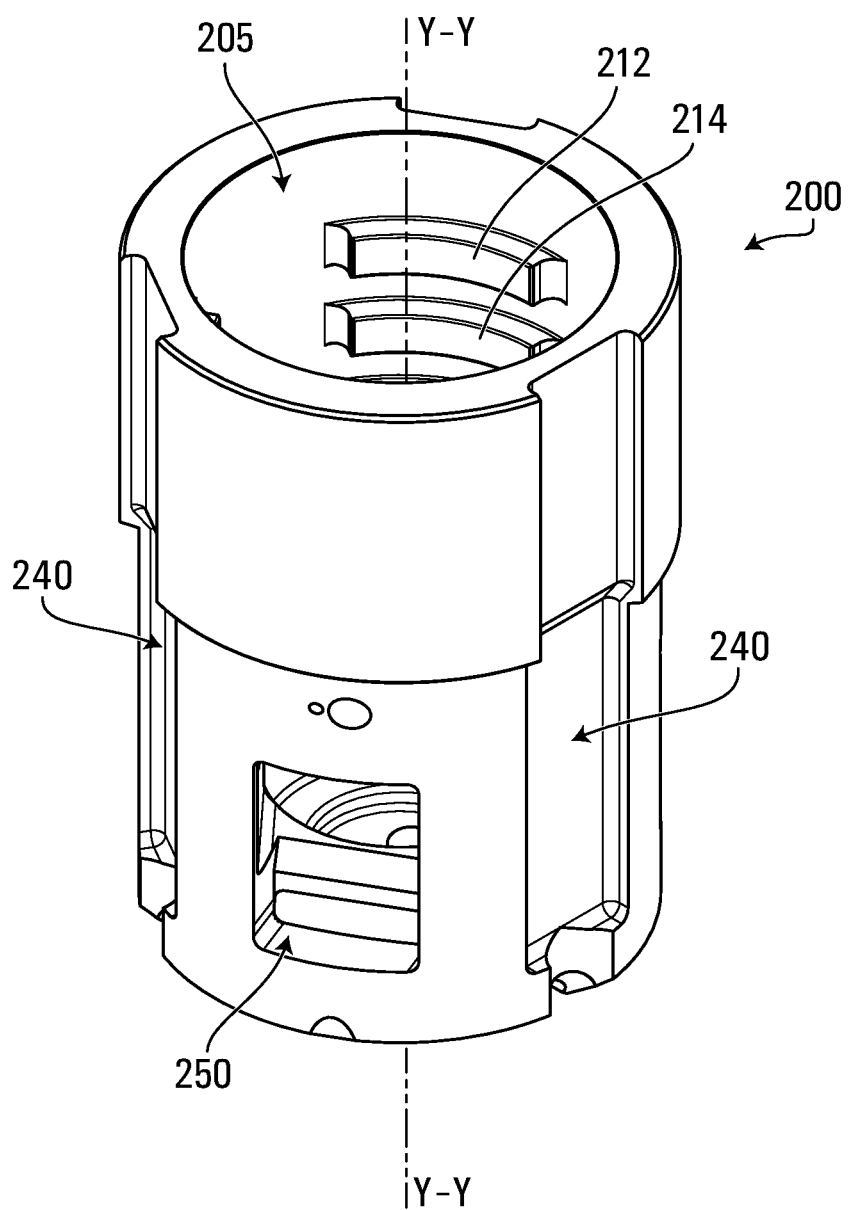
FIG. 17 is a perspective view of the guide device of the drilling system shown in FIG. 1.
Figure 18:
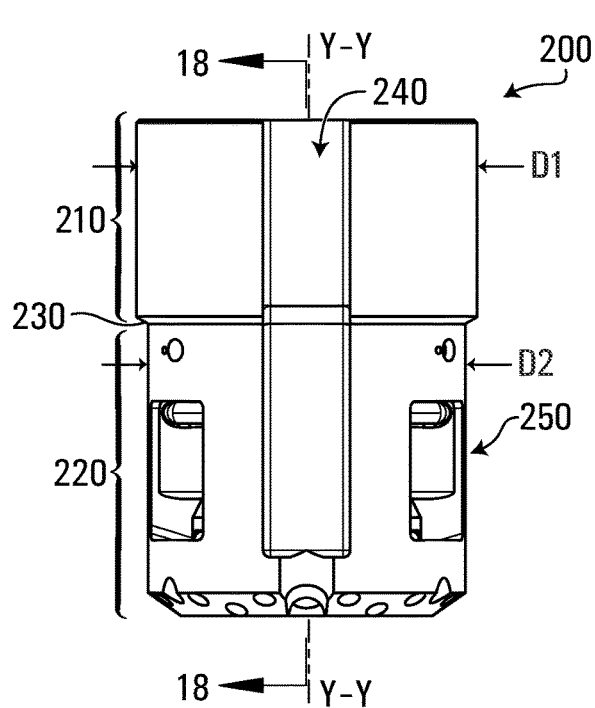
FIG. 18 is a side elevational view of the guide device shown in FIG. 17.
Figure 19:
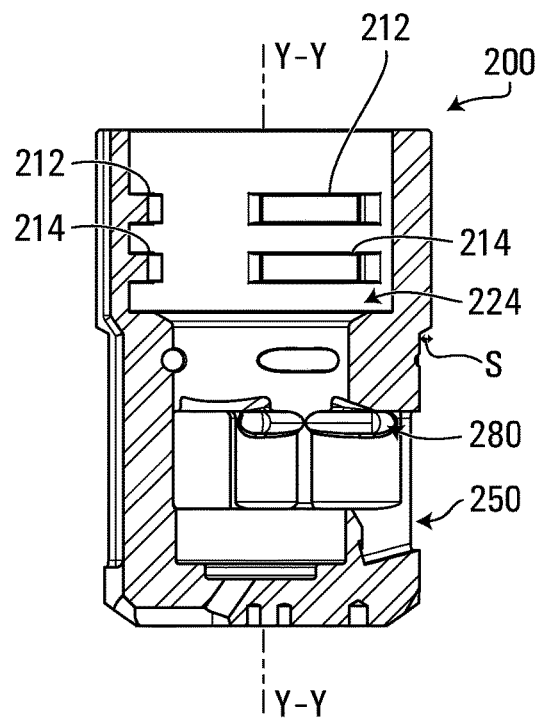
FIG. 19 is a sectional view of the guide device shown in FIG. 17 taken along lines 18-18 in FIG. 18.
Figure 20:
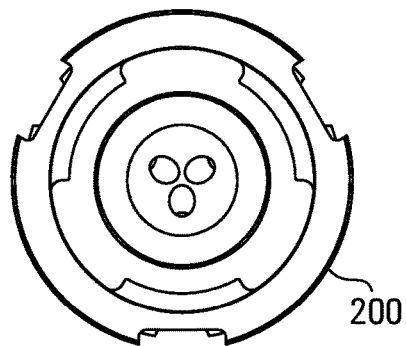
FIG. 20 is a top plan view of the guide device shown in FIG. 17.
Figure 21:
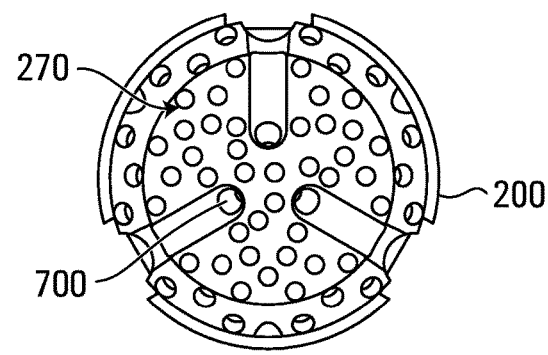
FIG. 21 is a bottom plan view of the guide device shown in FIG. 17.

FIG. 8 illustrates a cross-section of an example of a drilling system 1 according to the present invention. The cross-section is being taken in a horizontal plane intersecting perpendicularly the longitudinal axis X-X of the driver 100 at a middle portion of the lower section 102. The cross-section plane intersects horizontally an upper portion of the lower section 220 of the guide device 200, and shows how the driver 100 is secured within the guide device 200 by the retaining system 400.

The retaining system 400 can be implemented in more than one way. In this embodiment, the retaining system 400 resides at the upper portion of the lower section 220 of the guide device 200 and includes retaining pins 401 inserted in holes 260 in a slide-fit fashion. The retaining pins 401 are secured in holes 260 by mechanical fasteners, for instance by circlips 800, such that the percussions or impacts imparted by the hammering action of the DTH or top hammer to the drilling system may not accidentally dislodge the retaining pins 401 from the holes 260. In other variants, the retaining pins 401 may also be inserted in holes 260 in a press-fit fashion without the need of mechanical fasteners to secure the retaining pins 401 in holes 260. The holes 260 are oriented in directions perpendicular to a longitudinal axis Y-Y of the guide device 200 (but not intersecting the longitudinal axis) and located on the periphery of the guide device 200. In this example, the retaining pins 401 lay in the same horizontal plane, i.e. they are coplanar (as illustrated in FIG. 8). The retaining pins 401 are configured such that their respective longitudinal axes Z1, Z2, Z3 generally intersect at the periphery of the guide device 200. In this embodiment, the three retaining pins 401 form the edges of a triangle (the exact geometrical shape does not impact how the retaining system 400 may work; this is simply for the reader to better understand what is represented on FIG. 6). In other embodiments, for instance, where there may be four retaining pins 401, the retaining pins 401 form the edges of a square (instead of a triangle as described above). Yet in other variants, the retaining system 400 can be implemented in any other suitable manner (i.e. not necessarily implemented with retaining pins 401).

Figure 4:
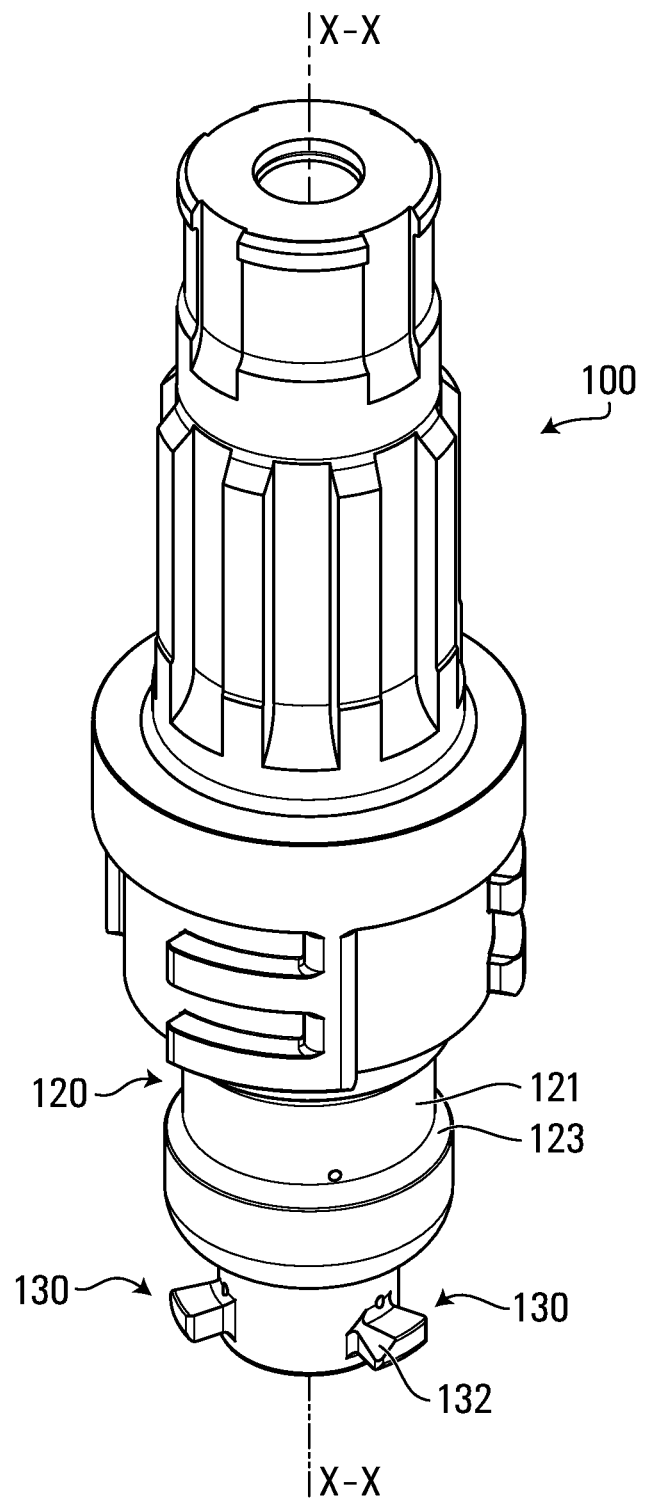
FIG. 4 is a perspective view from the top of a driver of the drilling system shown in FIG. 1.

In this embodiment, the middle portion of the lower section 102 of the driver 100 includes a constricted area 120 (i.e. an area having a smaller diameter than the lower and upper adjacent portions thereof) having a circumferential surface 121 delimited by an upper end-of-travel abutment 122 and a lower end-of-travel abutment 123 (as best shown in FIGS. 4 to 6). In this embodiment, the surface 121 of the constricted area 120 is configured to be in slidable interaction with the circumference of the retaining pins 401 distributed about the constricted area 120 when the driver 100 axially moves with relation to the guide device 200 between the first axial position (described above) and the second axial position (described above), where the driver 100 is engaged deeper within the guide device 200. In this embodiment, the retaining pins 401 generally engage the abutment 123 about the constricted area 120 when the driver 100 is in the first axial position, and the constricted area 120 is configured such that the retaining pins 401 generally engage the abutment 122 when the driver 100 is in the second axial position.

FIGS. 2, and 9 to 12 illustrate an example of a first drilling configuration and show how the guiding surface 125 of the enlargement 104 abuts against the wings 300, hence interacts with the wings 300 when the driver 100 is positioned within the guide device 200 in the first axial position, and how the locking mechanism for locking the wings 300 in the retracted position prevents the wings 300 from extending outwardly from the guide device 200 when the driver 100 and the guide device 200 lock in the first locking position. In this embodiment, the drilling system 1 connected to a DTH hammer or drilling rod (not shown) can drill a hole while wings 300 are arranged in a retracted position, i.e. the wings 300 rest in a completely (or substantially) retracted manner within corresponding apertures 250 in the guide device 200. In this position, the wings 300 are positioned such that the guide device 200 is the only part of the drilling system 1 that contacts the ground beneath while drilling. In this first drilling configuration, the driver 100 is in the first axial position and retaining pins 401 of the retention system 400 generally coincide with the lower end-of-travel abutment 123 of the driver 100. In this axial position, if the driver 100 twists in a clockwise direction, the slots and the projections of the bayonet connection mesh so that the driver 100 and the guide device 200 are locked against a relative angular and axial movement, in a first locking position. In this locking position, the lower extremity of the enlargement 104 frees the rear surface 350 of the wings 300, i.e. the guiding surface 125 of the enlargement 104 does not press against the rear surface 350 of the wings 300 resting in the retracted position. In this first locking position, the locking mechanism for locking the wings 300 in the retracted position is configured such that each one of the radial projections 130 respectively rotatably engages a notch 340 formed at an inner surface 320 of each one of wing 300. By engaging the notch 340 of a respective wing 300, each radial projection 130 prevents a pivotal movement of the wing 300, i.e. each wing 300 is mechanically constrained (retained) in its retracted position. In order to enable the wings 300 to pivot, the driver 100 has to be turned in a counterclockwise direction relative to the guide device 200, to unlock from the guide device 200 and disengage the radial projections 130 from the notches 340 from the respective wings 300. In other variants, the drilling system 1, including its driver 100 and guide device 200, may be configured such that the driver 100 has to be turned in a clockwise direction instead of a counterclockwise direction relative to the guide device 200 to unlock the driver 100 from the guide device 200.

FIGS. 3 and 13 to 16 illustrate an example of a second drilling configuration and illustrate how the guiding surface 125 of the enlargement 104 of the driver 100 interacts with the wings 300 when the driver 100 is positioned within the guide device 200 in the second axial position. In this embodiment, the drilling system 1 can drill a hole while the wings 300 are in the extended position. The wings 300 extend from the apertures 250 at an angle of attack θ relative to the longitudinal axis Y-Y of the guide device 200. When the wings 300 are in the extended position, the angle of attack θ of each wing 300 is generally the same, as a result of the enlargement 104 being concentric relative to the rear surface 350 of the wings 300 and thus pushing equally on the rear surface 350 of each wing 300. This may help to better balance the drilling system and may provide a balanced distribution of the drilling forces in the components of the drilling system 1. In this embodiment, the angle of attack θ of each wing 300 is around 30°. In other embodiments, the angle of attack θ may be around 20°, around 60°, or any other suitable angle of attack θ. In this second drilling configuration, while the wings 300 are in their extended position, the slots and the projections of the bayonet connection may mesh so that the driver 100 and the guide device 200 may lock in a second locking position. The wings 300 are therefore blocked in their extended position.

If the driver 100 and the guide device 200 disengage from the second locking position, axial movement of the driver 100 within the guide device 200 is now possible. The driver 100 can thus longitudinally move relative to the guide device 200 from the second axial position towards the first axial position, which in turn allows the wings 300 to pivotally retract from their extended position. As will be discussed later, the wings 300 can retract from their extended position to their retracted position simply by the effect of gravity or by applying a concentric force on the wings 300.

The driver 100 includes an open channel 190 extending centrally along the longitudinal axis X-X of the driver 100 which constitutes a pathway for compressed air (or other fluids and/or mixtures, for instance water, drilling foam, chemical products, or other fluids) towards the bottom end of the drilling system 1 to dislodge clogs or debris.

As shown on FIGS. 17 to 20, the guide device 200 has a generally circular geometry. It includes an open upper end 205 to receive the driver 100, an upper section 210 and a lower section 220. The upper section 210 of the guide device 200 has an outer diameter D1 and the bottom section 220 has an outer diameter D2. The outer diameter D1 of the guide device 200 is larger than the outer diameter D2. For instance, in this example, the outer diameter D1 measures no more than 12 inches (no more than 30.5 cm) and the outer diameter D2 measures no more than 11 inches (no more than 28 cm). In other embodiments, the diameters D1 and D2 may have other dimensions. For instance, in other embodiments, the outer diameter D1 may be identical to the outer diameter D2.

The junction of the upper and bottom sections 210, 220 of the guide device 200 forms a shoulder 230. The shoulder 230 includes a chamfer. When the drilling system 1 operates for drilling a hole and simultaneously driving down a casing in the hole being drilled, the shoulder 230 abuts against an abutment ring 510 mounted to an end of a casing to enable the drilling system 1 to drive down the casing in a hole being drilled.

The shoulder 230 may have any suitable dimension. For instance, in this embodiment, a thickness S of the shoulder 230 is no more than 0.5 inches (no more than 1.3 cm). In other embodiments, the thickness S is no more than 0.2 inch (no more than 0.5 cm). The thickness S may vary depending on the size of the drilling system 1 and/or the size of the DTH hammer used. For instance, in some cases, a ratio of a thickness S over an outer diameter D1 of the guide device 200 is preferably less than 8%. If the shoulder 230 is too thin, the shoulder 230 may wear too quickly due to friction with an abutment ring 510 (described later) mounted to an end of a casing when the drilling system 1 operates for drilling a hole and simultaneously driving down a casing in the hole being drilled. If the shoulder 230 is too large, the wings 300 may have to extend more (e.g. the angle of attack θ may have to be larger and/or the wings 300 may have to be longer) to sufficiently increase the bore size of the drilling system for being larger than the outer diameter of the casing being driven down.

The guide device 200 includes sludge discharging grooves 240 extending longitudinally along a length Lx of the guide device 200 on its outer surface for ejecting sludge, sands, pebbles, and grindings from the bottom of the borehole while drilling occurs. The guide device 200 includes three sludge discharging grooves 240 distributed about the periphery of the outer surface of the guide device 200. In other variants, there may be more or less sludge discharging grooves 240, and/or the discharging grooves 240 may be at least partly curved and/or at angle relative to the longitudinal axis Y-Y of the guide device 200 of the drilling system 1 instead of being straight.

The apertures 250 for receiving the wings 300 are equally spaced apart and reside circumferentially in the lower section 220 of the guide device 200. In other variants, the apertures 250 may not be equally spaced apart.

Figure 38:
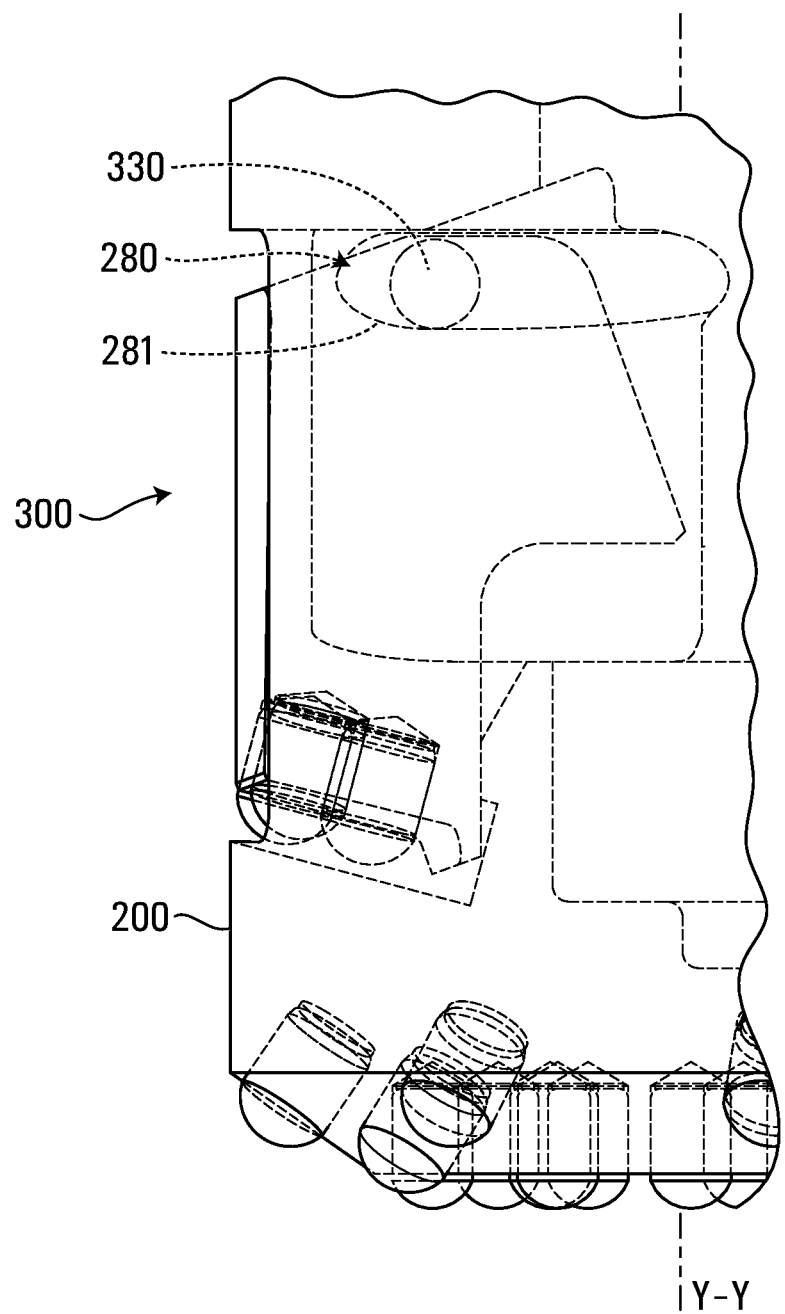
FIG. 38 is a partial sectional view of the guide device shown in FIG. 17, showing an inner portion of the guide device which receives a wing.
Figure 39:
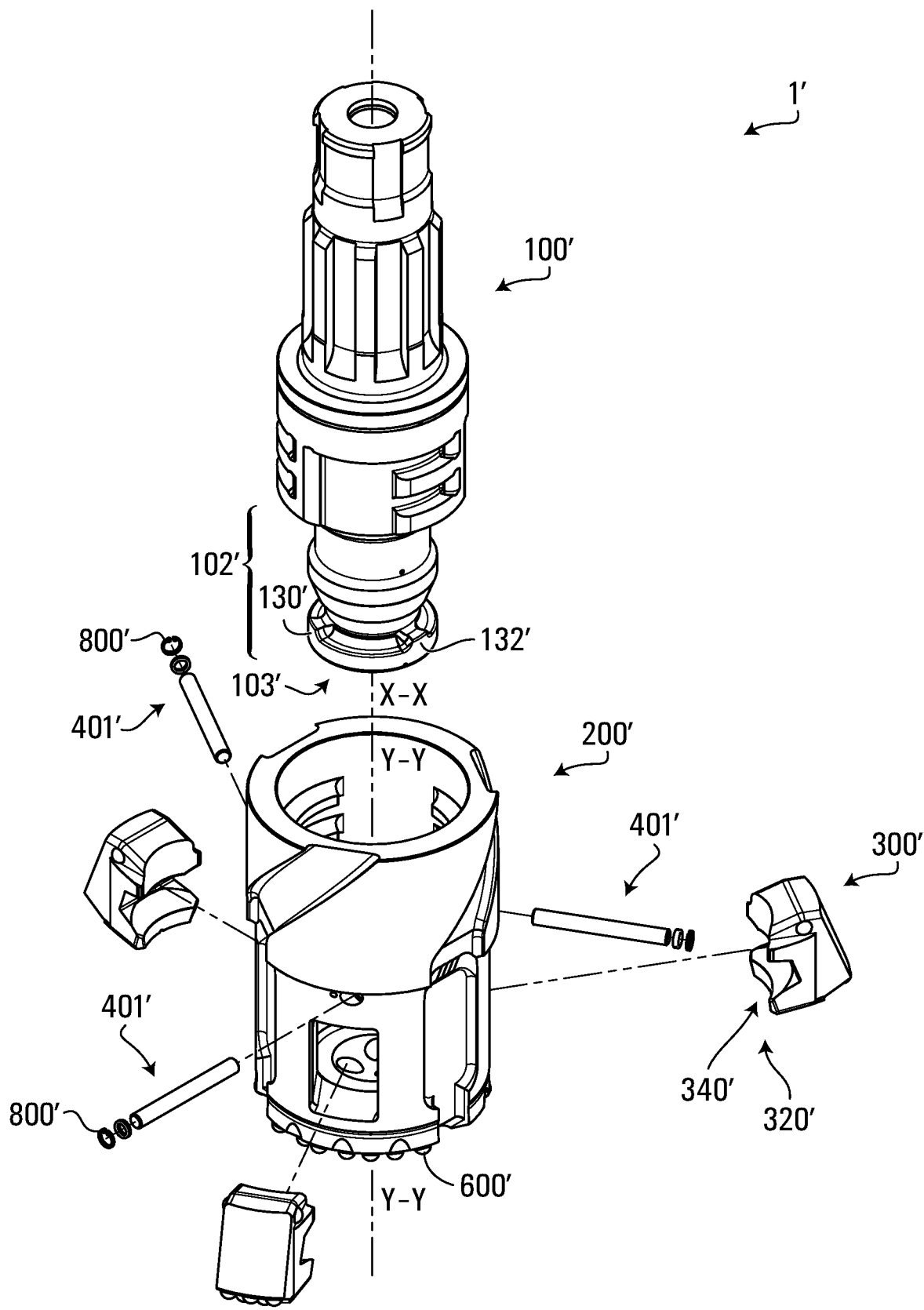
FIG. 39 shows an exploded view of another example of implementation of the drilling system according to the invention.
Figure 40:
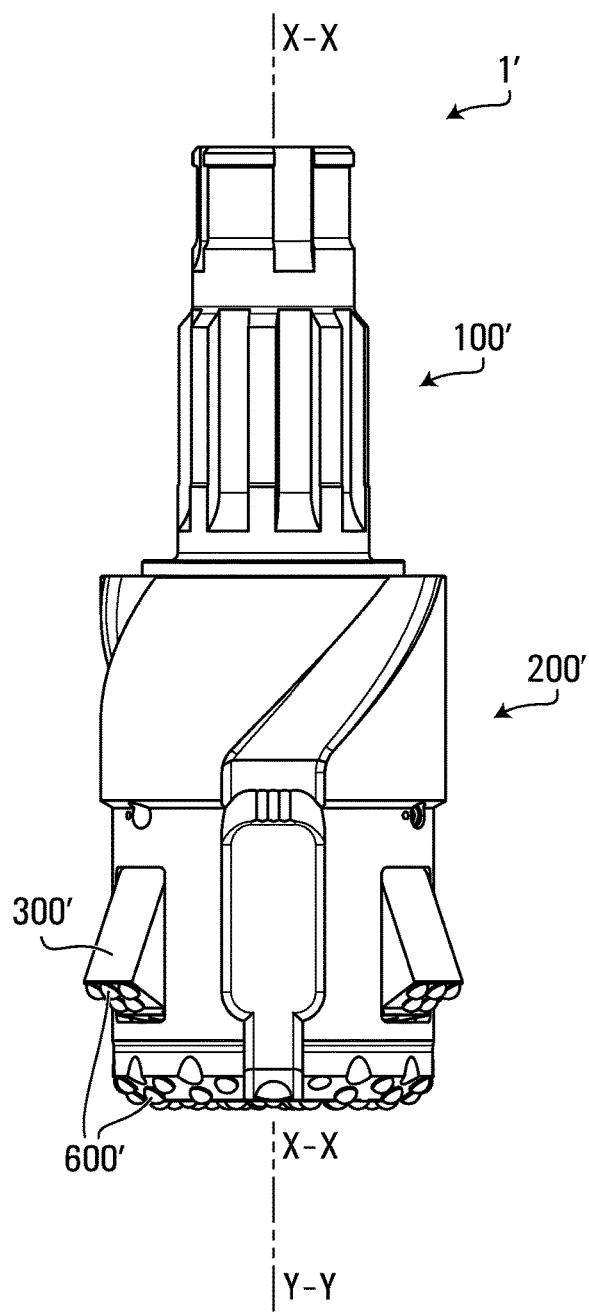
FIG. 40 shows a side elevational view of the drilling system shown in FIG. 39, shown in a configuration in which wings are expanded to drill a large diameter hole.
Figure 41:
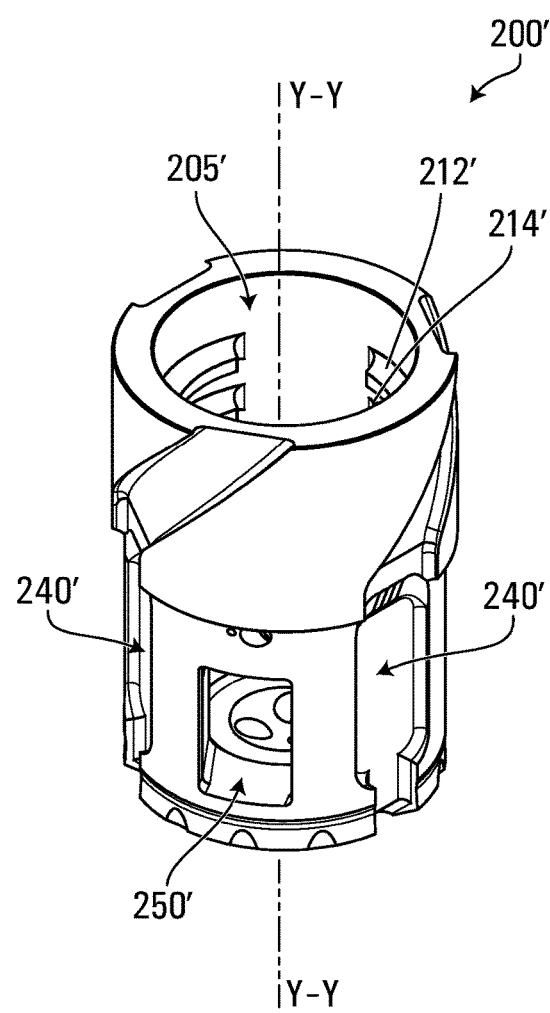
FIG. 41 shows a perspective view of the guide device of the drilling system shown in FIG. 39.
Figure 42:
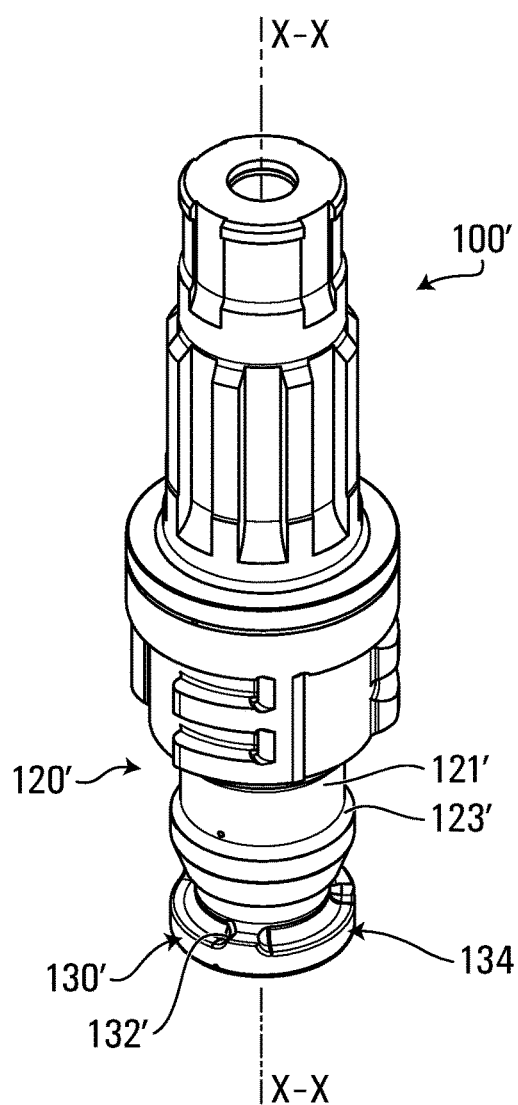
FIG. 42 shows a perspective view of a driver of the drilling system shown in FIG. 39.
Figure 43:
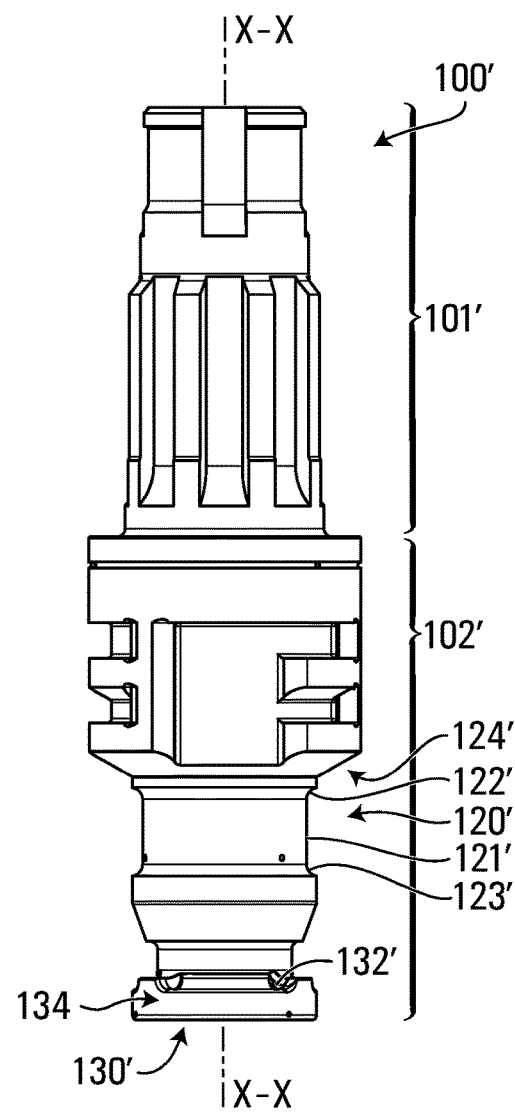
FIG. 43 shows a side elevational view of the driver of the drilling system shown in FIG. 39.
Figure 47:
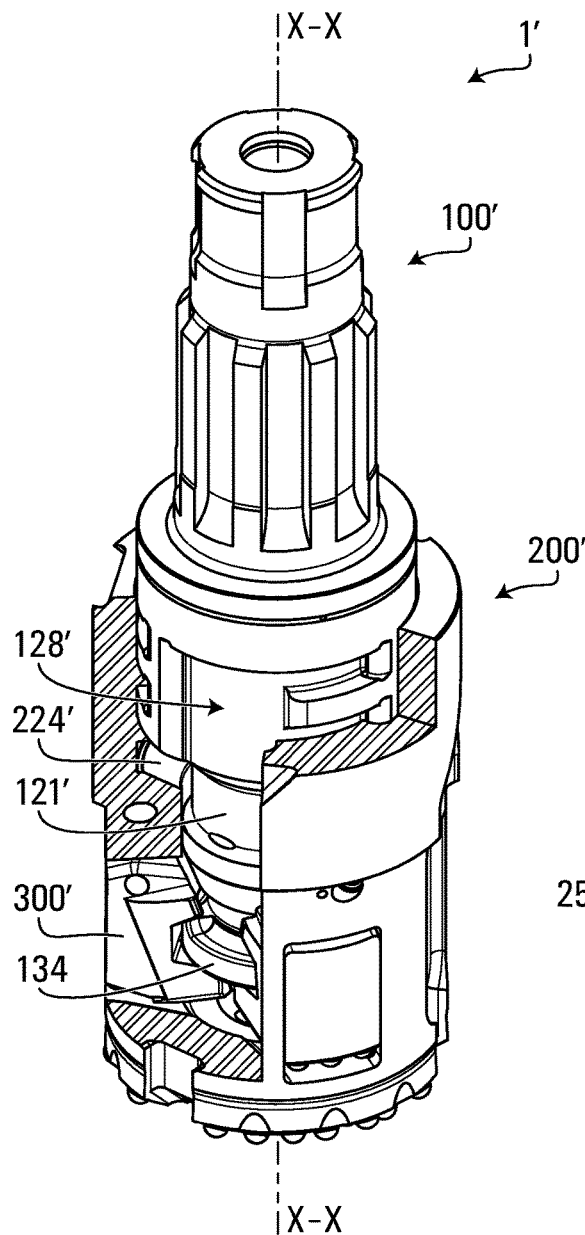
FIG. 47 shows a perspective view of the drilling system shown in FIG. 39, the view being partly cut away to show features of the driver, the guide device and the wings of the drilling system, which is shown in a configuration in which the wings are locked in a retracted position.
Figure 48:
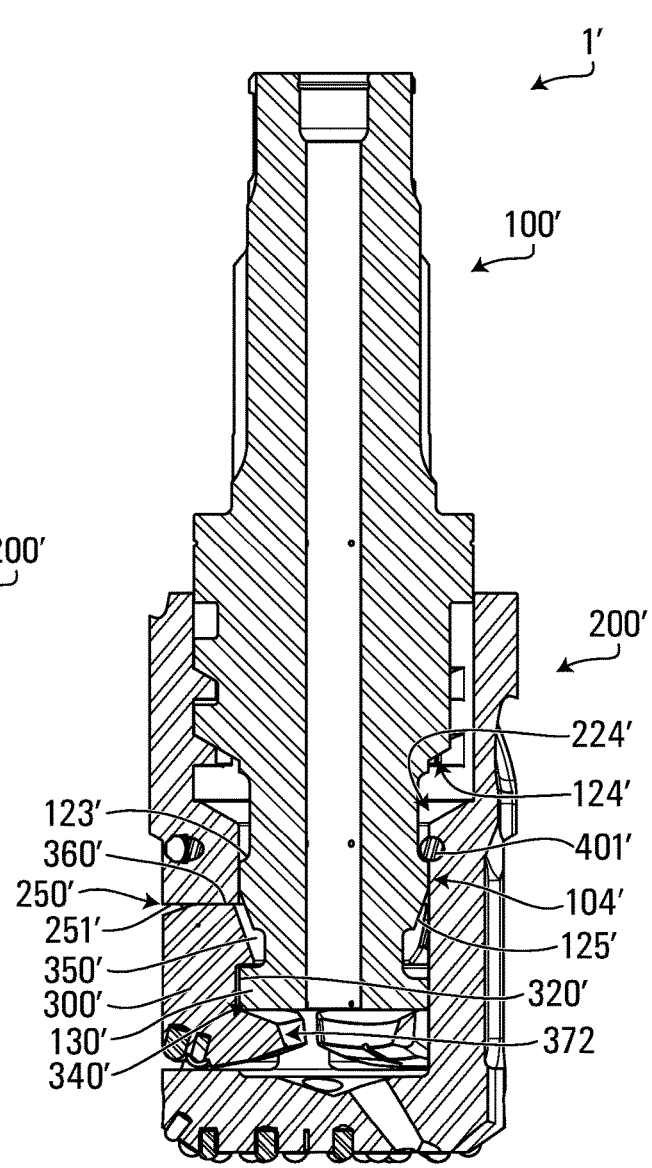
FIG. 48 shows a sectional view of the drilling system taken along line X-X of FIG. 47.
Figure 49:
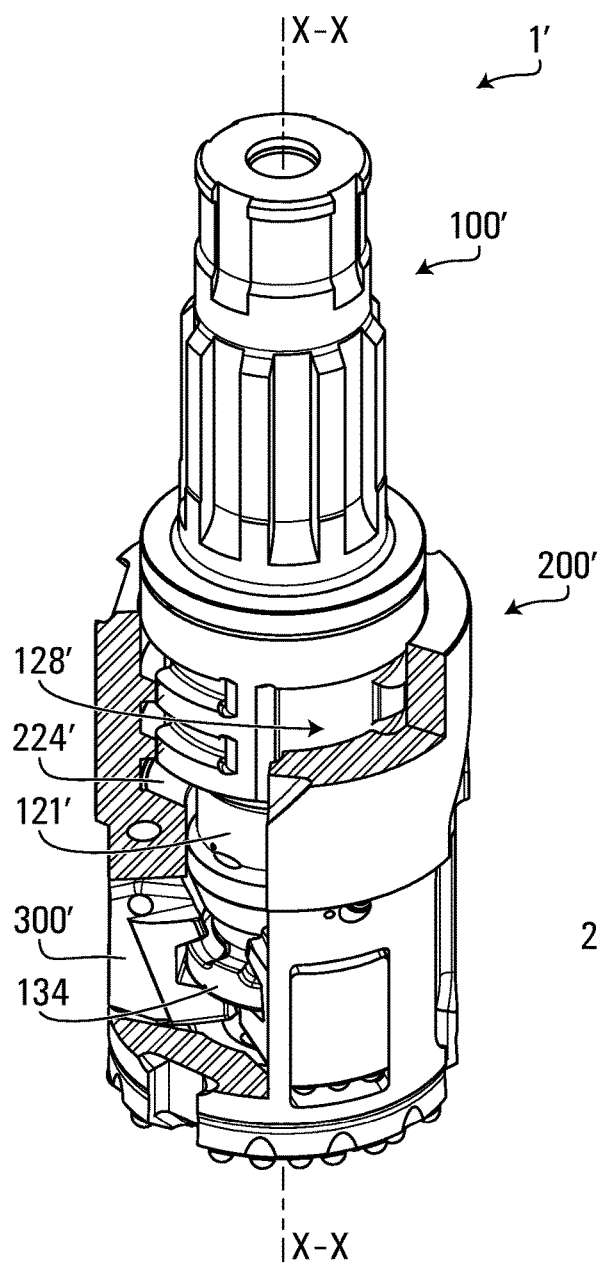
FIG. 49 shows a perspective view of the drilling system shown in FIG. 39, the view being partly cut away to show features of the driver, the guide device and the wings of the drilling system, which is shown in a configuration in which the wings are in a retracted position and unlocked.
Figure 50:
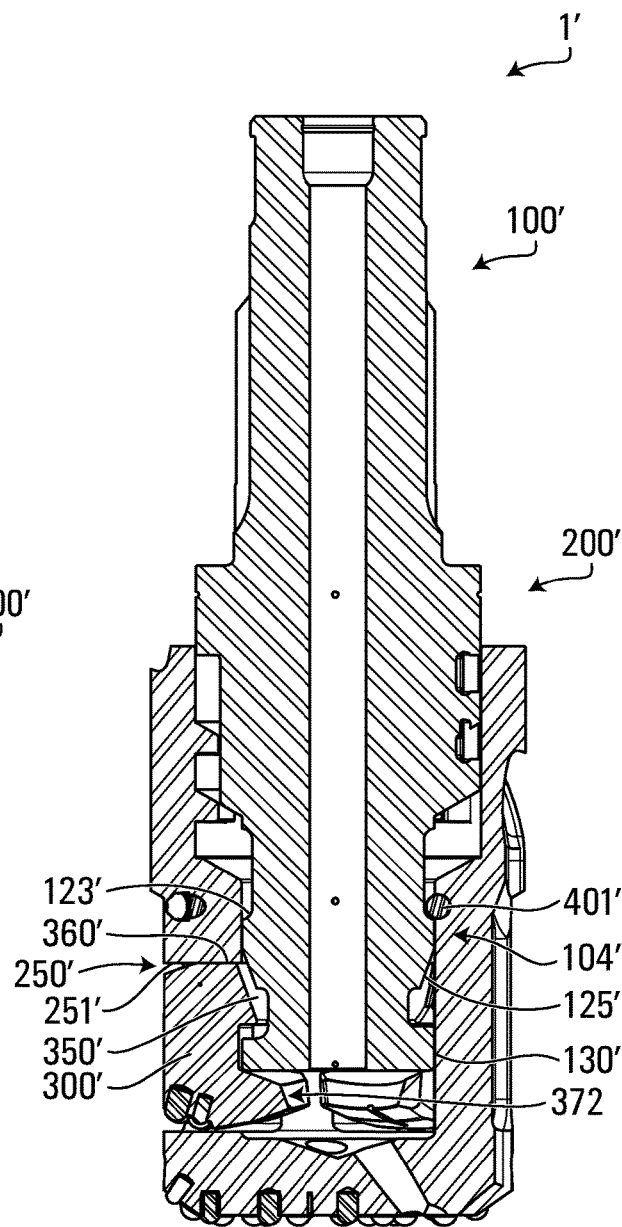
FIG. 50 shows a sectional view of the drilling system taken along line X-X of FIG. 49.
Figure 55:
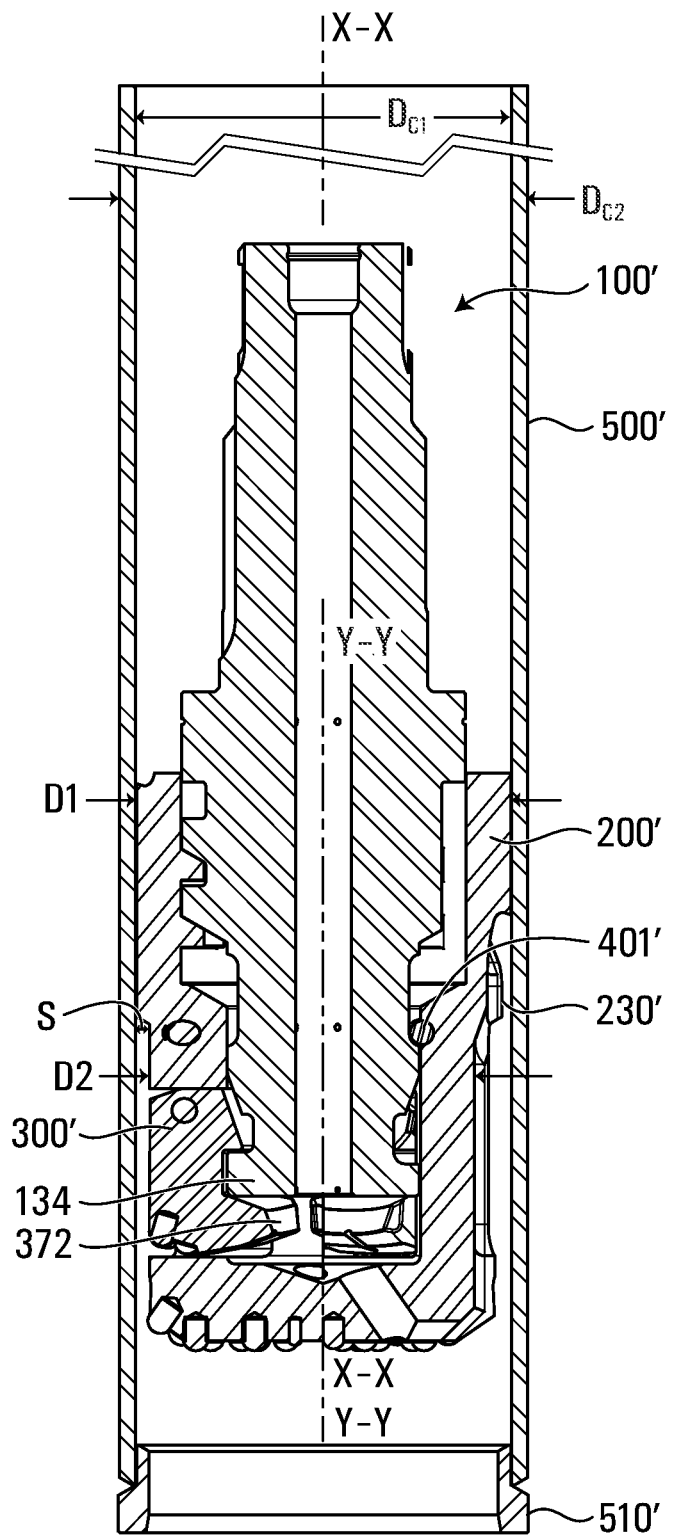
FIG. 55 shows a sectional view of the drilling system shown in FIG. 39, shown within a casing, the wings of the drilling system being in a retracted position and locked, the section being taken along the longitudinal axis of the drilling system, the drilling system being configured to drill inside the casing.
Figure 56:
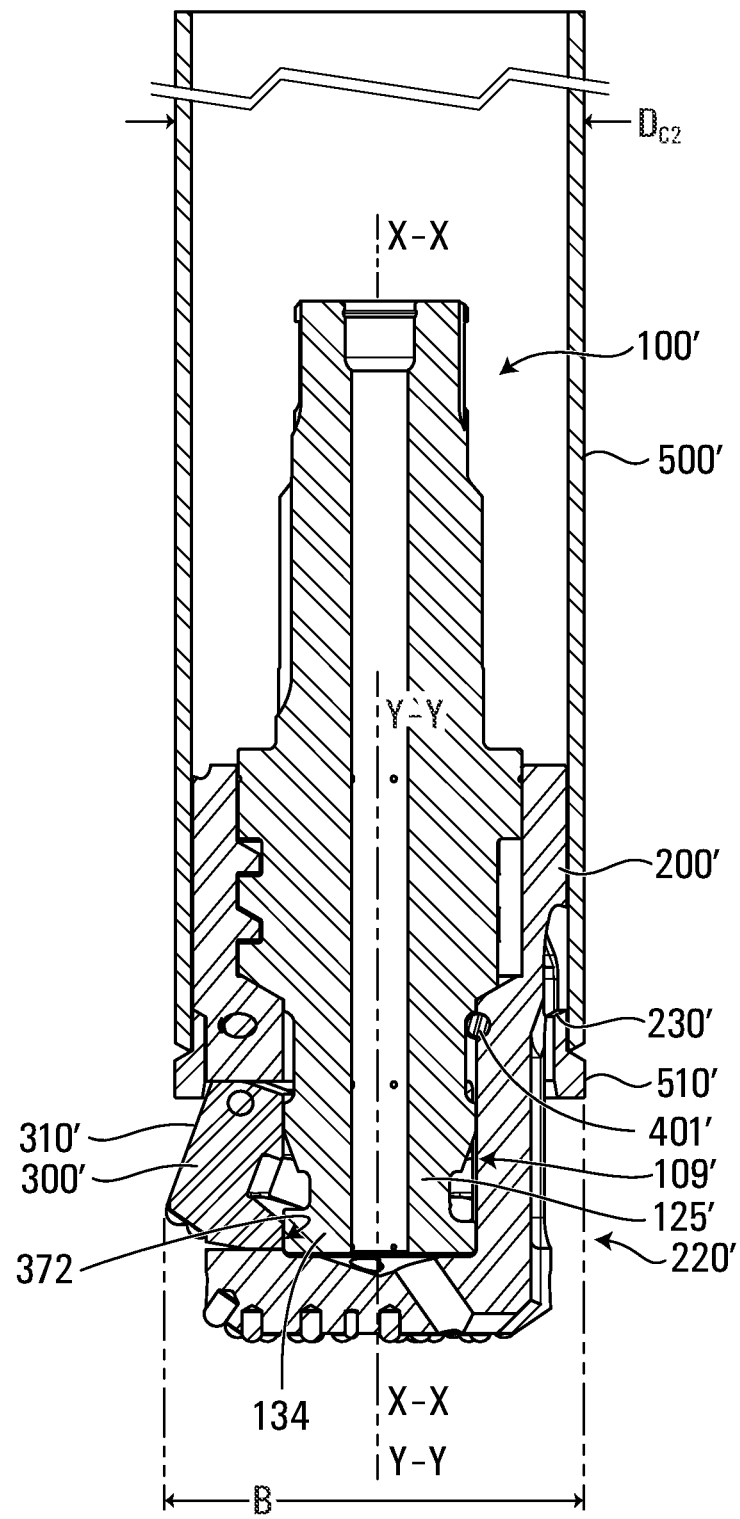
FIG. 56 shows a sectional view of the drilling system shown in FIG. 39, shown within a casing, the wings of the drilling system being in an extended position and locked, the section being taken along the longitudinal axis of the drilling system, the drilling system being configured to drill a large diameter hole, for instance to install a casing.

FIG. 38 depicts the interior of the guide device 200. In this embodiment, the guide device 200 includes a pair of slots 280 forming pivot supports 281 for receiving a pair of wing pivot nipples 330 (best shown in FIGS. 26 to 28). When installing each wing 300 in an aperture 250 of the guide device 200, the pair of wing pivot nipples 330 aligns with a pair of slots 280 and slide therein until they generally reach the closed end (i.e. the extremity) of each slot 280. In this position, the pair of wing pivot nipples 330 may rest in place in the slots 280, such that each wing 300 may be freely supported without additionally being secured or fastened to the guide device 200. In this position, the wings can pivot between the retracted position and the extended position, as described above. In other embodiments, the interior of the guide device 200, for instance, for receiving wings 300, may be configured in any other suitable manner.

FIGS. 22 to 25 illustrate an example of the bayonet connection on the guide device 200 that allows locking the driver 100 to the guide device 200. In this embodiment, the bayonet connection on the guide device 200 includes a set of two vertically spaced apart arcuate elongated projections 212 and 214 at the upper section 210 of the guide device 200, each shaped as a segment of a circle. Both extremities of each of the elongated projections 212 and 214 have camming surfaces 216 and 218 to facilitate engagement with the inter-fitting features of the bayonet connection located on the driver 100.

Figure 22:
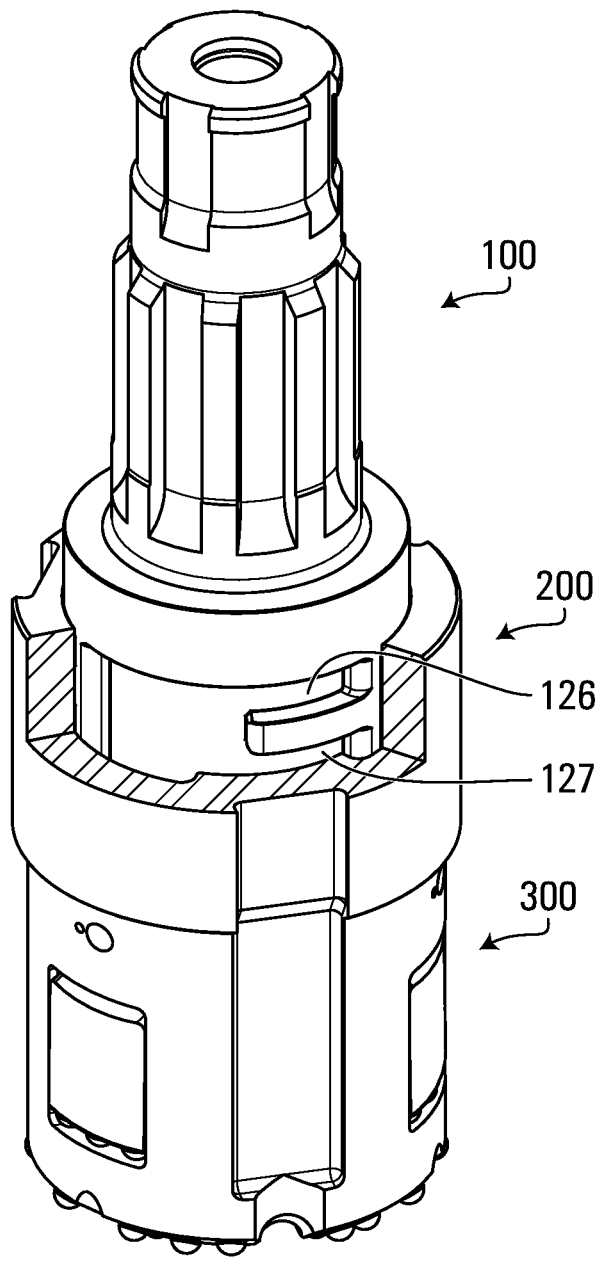
FIG. 22 is a perspective view of the driver and guide device assembly of the drilling system shown in FIG. 1, the view being partly cut away to show locking features of the driver allowing to lock the driver to the guide device in an axial position.

FIG. 22 illustrates an example of the drilling system 1 in the first drilling configuration as discussed above. As shown, when the driver 100 is in the first axial position and twists in a clockwise direction, an elongated projection 212 of the bayonet connection on the guide device 200 registers into a slot 127 of the bayonet connection on the driver 100. An arcuate projection 131 of the bayonet connection on the driver 100 registers between elongated projections 212 and 214 of the bayonet connection on the guide device 200. In this first drilling configuration, the bayonet connection is realized, and thus the driver 100 and the guide device 200 are locked against a relative angular and axial movement. The locking mechanism for locking the wings 300 in the retracted position blocks any further pivotal movement of the wings 300. When the drilling system 1 is drilling in this configuration, a majority of the impact force provided by the hammering action of the DTH hammer while drilling is transmitted to the guide device 200 through the driver 100 by an interface between elongated projections 212 and 214 of the guide device 200 and arcuate projections 131 and 133 of the driver 100.

Figure 23:
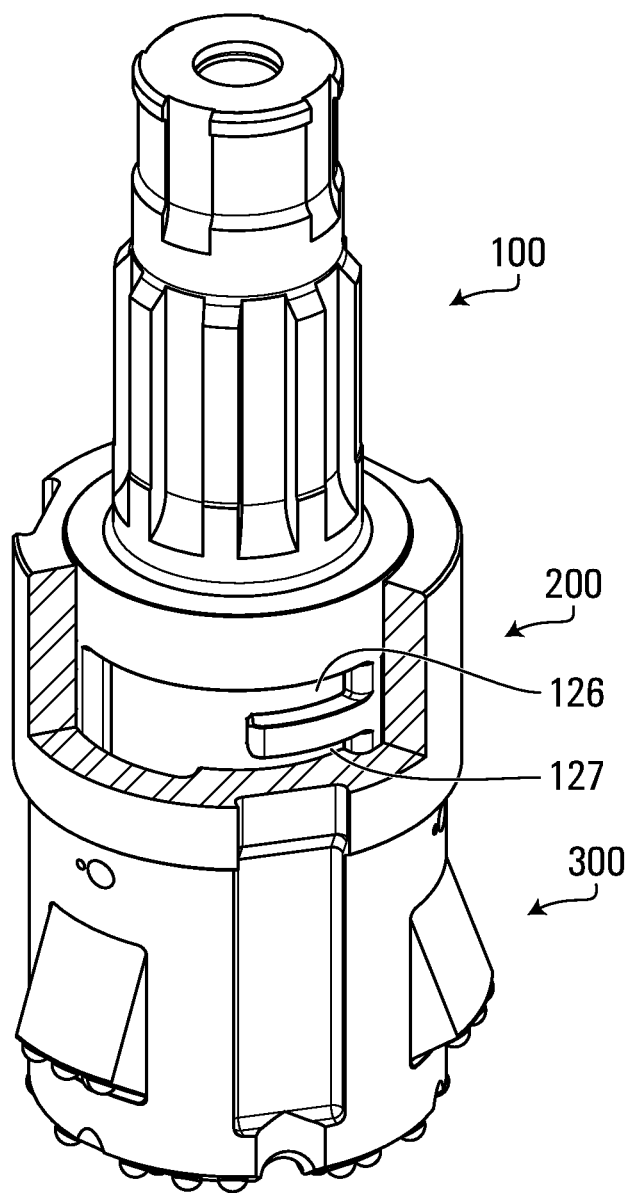
FIG. 23 is a perspective view of the driver and guide device assembly of the drilling system shown in FIG. 1, the view being partly cut away to show locking features of the driver allowing to lock the driver to the guide device in an axial position different from the position shown in FIG. 22.
Figure 24:
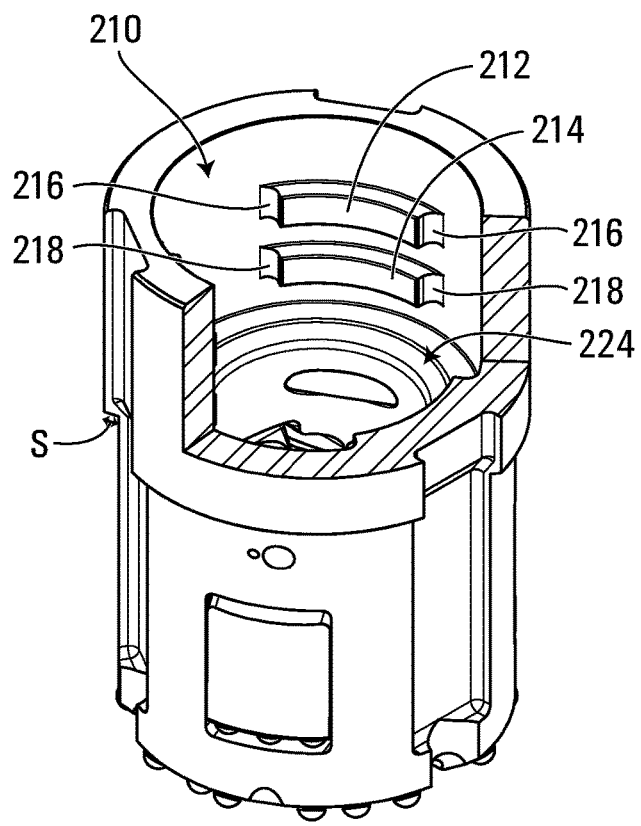
FIG. 24 is a perspective view of the guide device shown in FIG. 17, the view being partly cut away to illustrate locking features on the guide device which cooperate with the locking features on the driver of the drilling system shown in FIG. 1.
Figure 25:
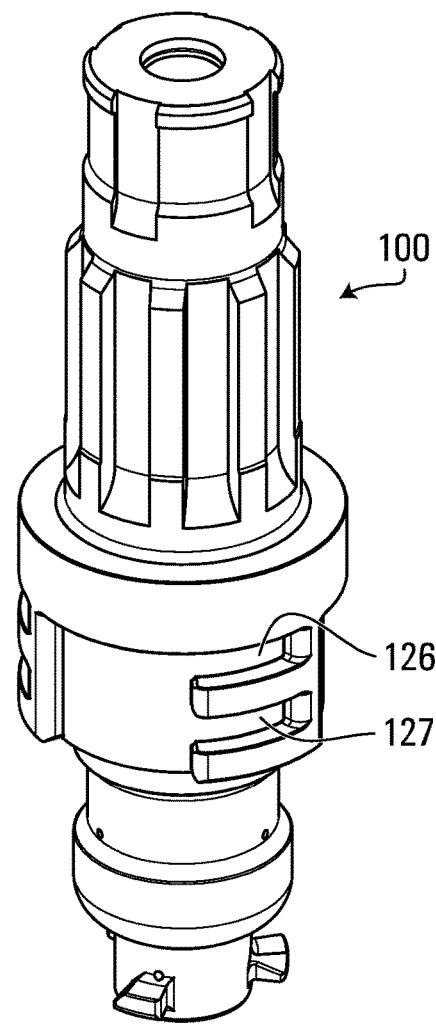
FIG. 25 is a perspective view of the driver shown in FIG. 4, the guide device being omitted.

FIG. 23 illustrates an example of the drilling system 1 in the second drilling configuration as discussed above. As shown, when the driver 100 is in the second axial position and twists in a clockwise direction, elongated projections 212 and 214 of the bayonet connection of the guide device 200 register respectively into slots 126 and 127 of the bayonet connection on the driver 100. In this second drilling configuration, the bayonet connection is realized, and thus the driver 100 and the guide device 200 are locked against a relative angular and axial movement, When the drilling system 1 is drilling in this configuration, at least a majority of the impact force provided by the hammering action of the DTH hammer while drilling is transmitted to the guide device 200 through the driver 100 by an interface between an impact transmission surface 124 located beneath arcuate projections 131 and prolonging along a circumference of the driver 100, and a corresponding impact transmission surface 224 on the guide device 200 configured for mating with said impact transmission surface 124 of the driver 100.

The guide device 200 includes fluid outlet ports 700 traversing the bottom face 270 thereof and fluidly communicating with channel 190 of the driver 100, thus allowing compressed air (or other fluids and/or mixtures, for instance water, drilling foam, chemical products) channeled therethrough to be discharged through fluid outlet ports 700. In some variants, there may be outlet ports at other locations at the periphery of the guide device 200.

The guide device 200 includes inserts 600 mated with a bottom face 270 of the guide device 200. The inserts 600 may include carbide buttons, or other types of buttons. The inserts 600 may be positioned on the bottom face 270 (including on an angled edge at the periphery of the bottom face 270), which is the surface of the guide device 200 that predominantly contacts the ground beneath when drilling. When worn out or broken, the inserts 600 may be replaced by new sets of inserts 600.

Different aspects and/or additional variants of the wings 300 will now be described.

Figure 26:
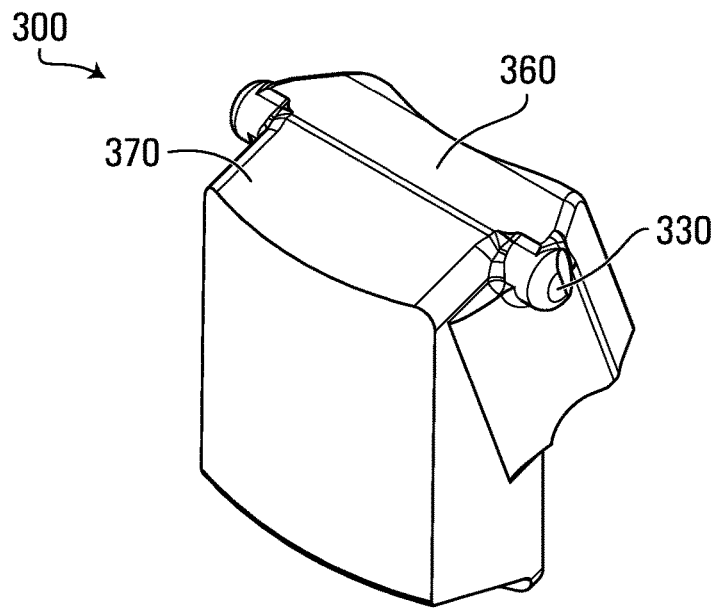
FIG. 26 is a perspective view of an example of implementation of a wing according to the present invention.
Figure 27:
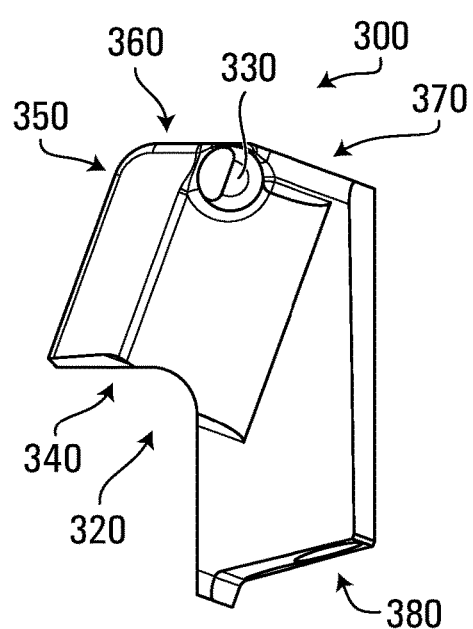
FIG. 27 is a side elevational view of the wing shown in FIG. 26.
Figure 28:
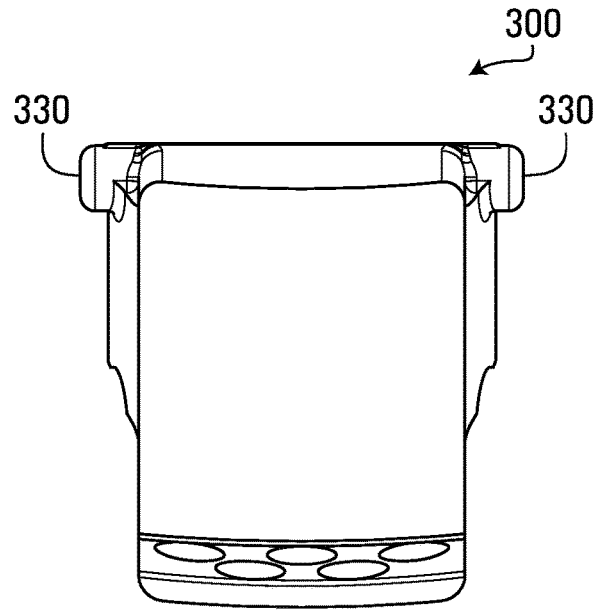
FIG. 28 is a front elevational view of the wing shown in FIG. 26.

FIGS. 26 to 28 illustrate an example of a wing 300 in accordance with the present invention. In this embodiment, each wing 300 includes an outer surface 310, an inner surface 320, wing pivot nipples 330, a notch 340 formed in the inner surface 320 of the wings 300, a rear surface 350, upper surfaces 360, 370 and a bottom surface 380.

Some characteristics of the wings 300 such as the shape, size and/or angle of attack θ, may affect working aspects of the drilling system 1. For instance, the bore size of the drilling system 1 while drilling in the second drilling configuration (discussed above) can be larger or smaller, depending on the shape, size and/or angle of attack θ of the wings 300. Alternatively or additionally, the shape, size and/or angle of attack θ of the wings 300 may affect how the wings 300 interacts with other components of the drilling system 1, such as the driver 100 and the guide device 200, including how the wings 300 interact with the locking mechanism of the driver 100 and contact the contact area on the guide device 200. Such aspects will be further discussed later with respect to variants of the drilling system 1.

When the wings 300 are in their extended position and the drilling system 1 drills a hole, the bottom surface 380 of the wings 300 strikes the ground. The bottom surface 380 of the wings 300 includes inserts 600 as those described above with respect to the guide device 200.

Returning to FIGS. 9 to 12, when the wings 300 are in their retracted position, the upper surface 360 of each wing 300 contacts an upper inner surface 251 of the apertures 250.

Returning to FIGS. 13 to 16, when the wings 300 are in their extended position, the upper surface 370 of each wing 300 contacts the upper inner surface 251 of apertures 250 and the rear surface of the wings 300 contact the enlargement 104. The contact area between upper surface 370 of the wings 300 and the upper inner surface 251 of apertures 250 is critical, in that stress applied on the bottom surface 380 of the wings 300 while the drilling system 1 strikes the ground beneath and drills a hole with the wings 300 in the extended position is mostly transferred to the guide device 200 structure at this contact area, such that less stress (or almost no stress) is applied to wing pivot nipples 330 during drilling in this drilling configuration.

Although wings 300 are generally described as being assembled in the guide device 200 and part of the drilling system assembly, wings 300 may, for instance, be included in replacement kits provided to operators of the drilling system 1.

In order to further describe how each part of the drilling system 1 that has been described above interacts, concurrently or alternately, an example of a drilling operation that may be done while using the drilling system 1 discussed above is described.

Figure 29:
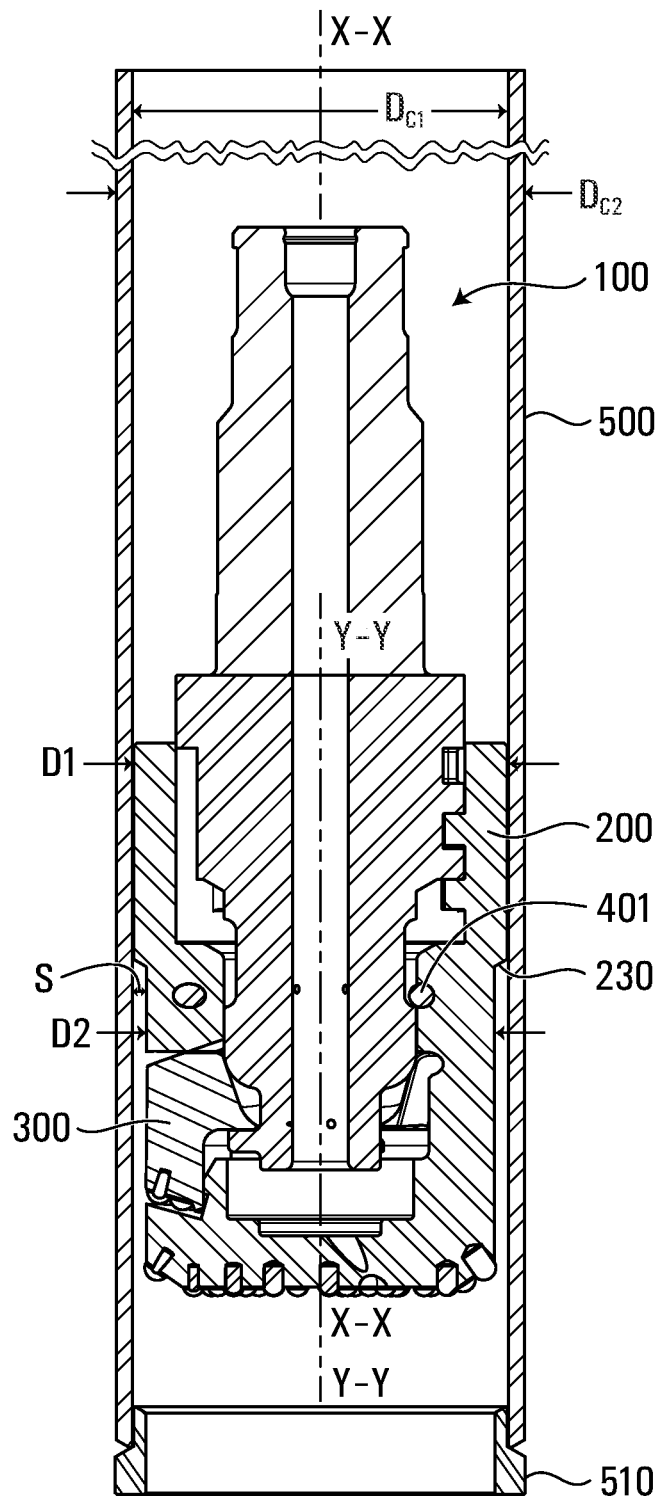
FIG. 29 is a sectional view of the drilling system shown in FIG. 1, shown within a casing, the wings of the drilling system being in a retracted position, the section being taken along the longitudinal axis of the drilling system.
Figure 30:
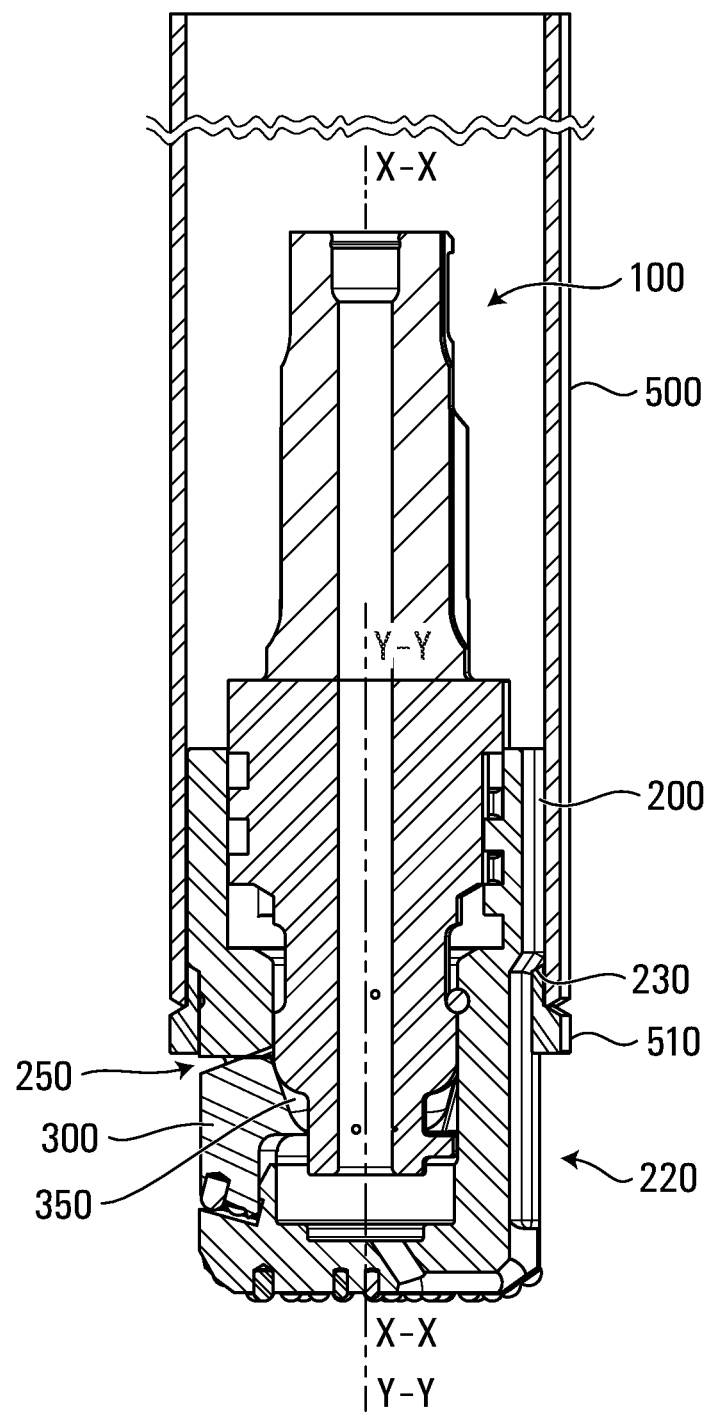
FIG. 30 is a sectional view of the drilling system shown in FIG. 29, the drilling system extending partially outside the casing and abutting against an abutment ring installed at a bottom end of the casing.
Figure 31:
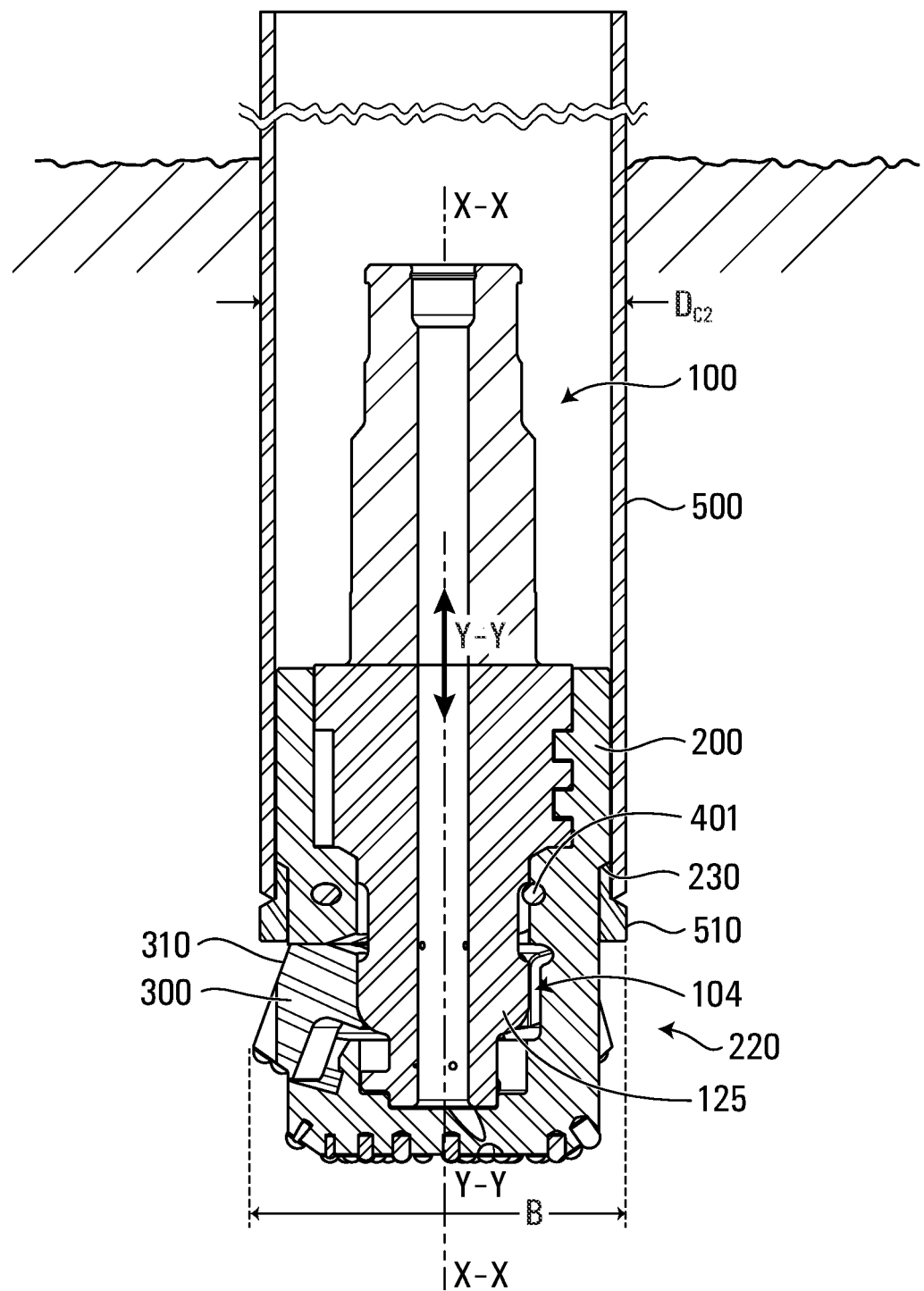
FIG. 31 is a sectional view of the drilling system as shown in FIG. 30, showing the wings of the drilling system in an extended position.
Figure 32:
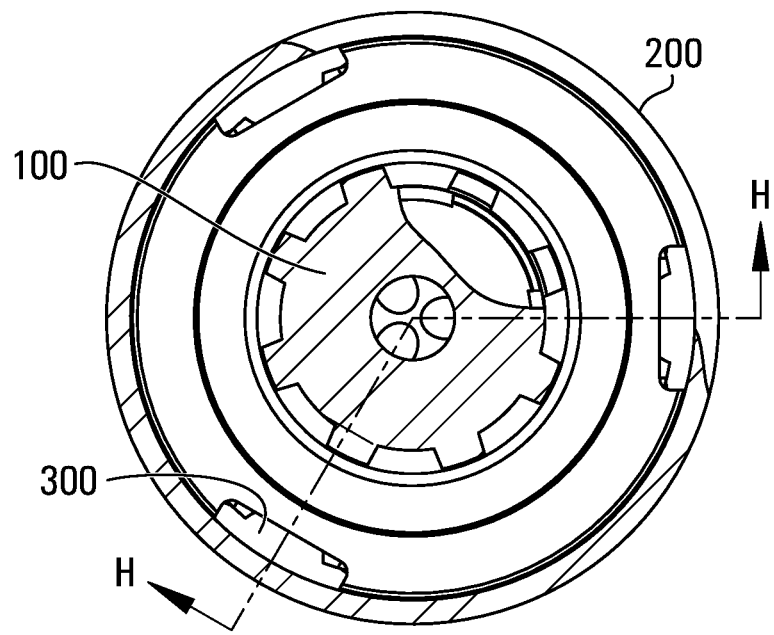
FIG. 32 is a top plan view of the drilling system shown in FIGS. 1 to 3.
Figure 33:
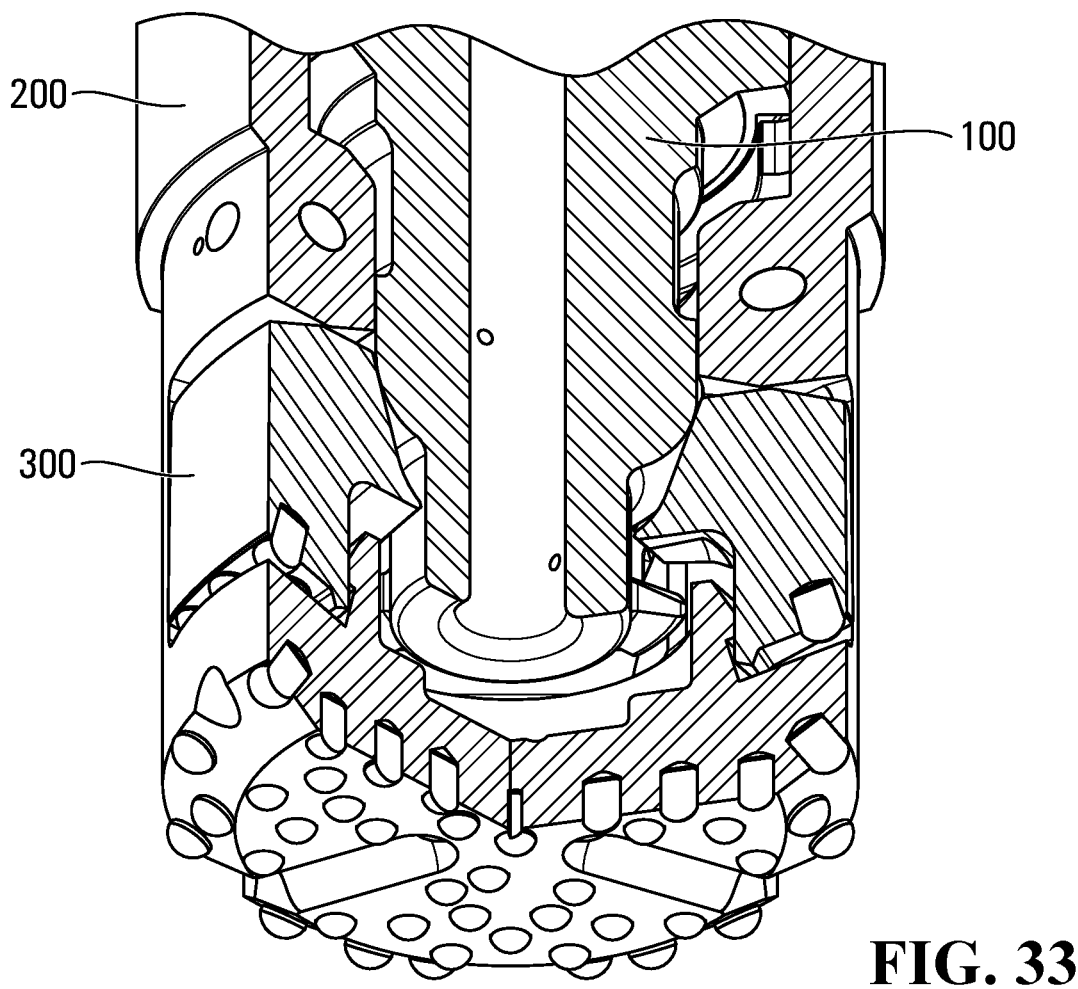
FIG. 33 is a perspective view from the bottom of the drilling system, the view being partly cut away along lines H-H in FIG. 32 to illustrate the cooperation between the driver, the guide device and the wings, shown in a configuration in which the wings are in a retracted position and unlocked.
Figure 34:
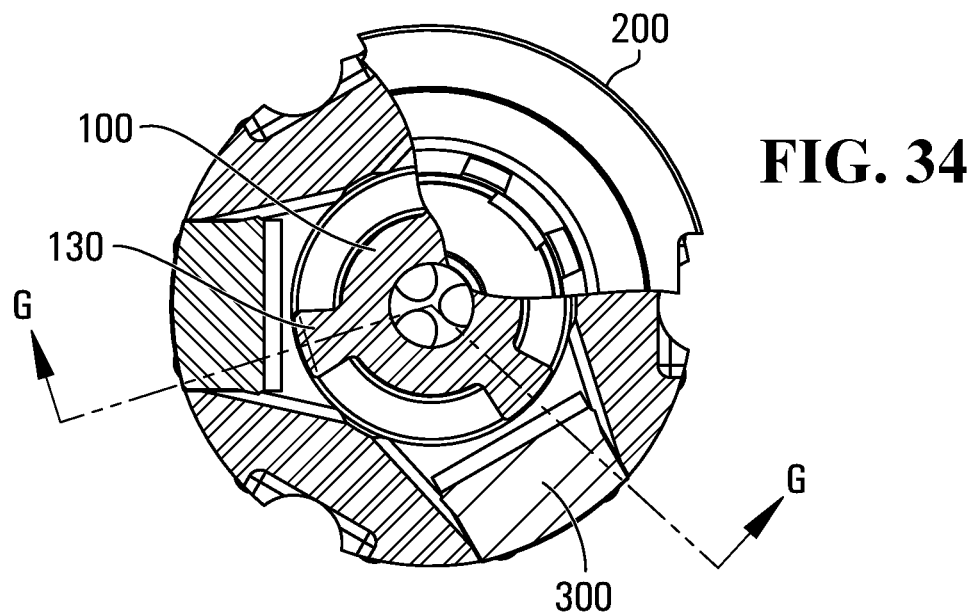
FIG. 34 is a top plan view of the drilling system shown in FIGS. 1 to 3, the view being partly cut away to show features of the driver and the guide device of the drilling system.
Figure 35:
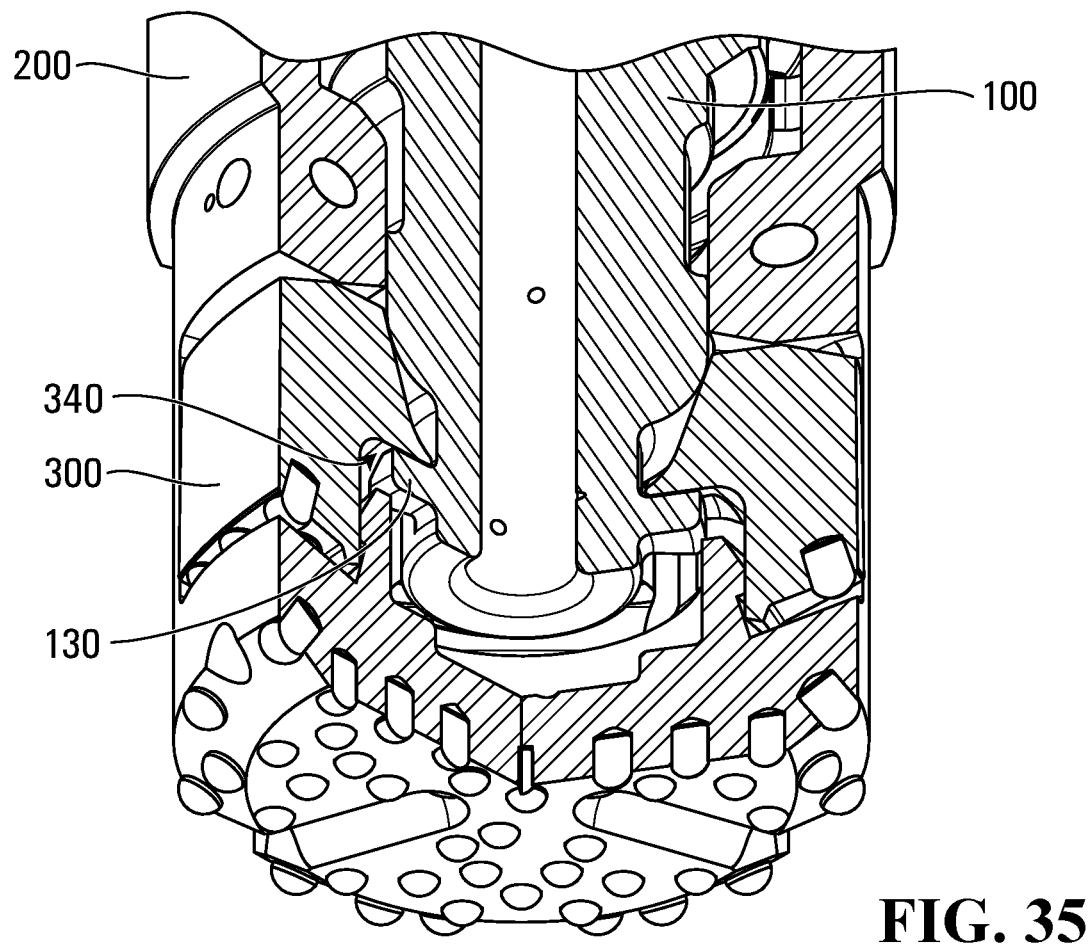
FIG. 35 is a perspective view from the bottom of the drilling system of FIG. 1, the view being partly cut away along lines G-G in FIG. 34 to illustrate the cooperation between the driver, the guide and the wings, shown in a configuration in which the wings are locked in a retracted position.
Figure 36:
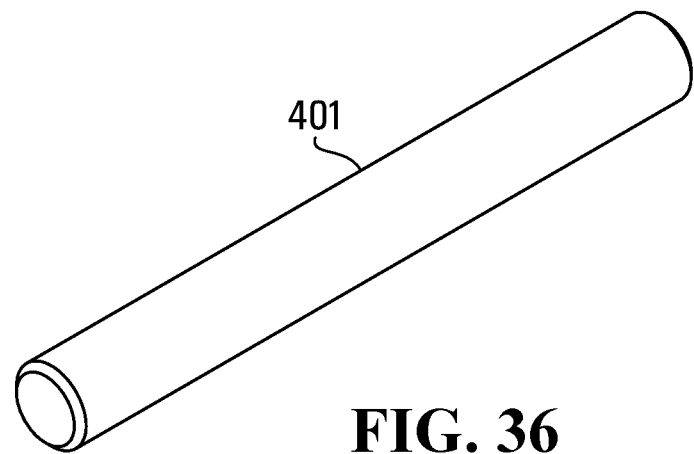
FIG. 36 illustrates a retaining pin of an example of implementation of the retention system for securing the driver to the guide device of the drilling system of FIG. 1.
Figure 37:
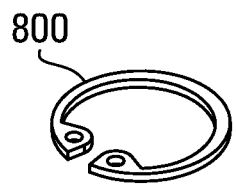
FIG. 37 illustrates an example of implementation of mechanical fasteners for securing the retaining pin shown in FIG. 36 for securing the driver to the guide device.

FIGS. 29 to 31 illustrate an example of drilling operation with a drilling system 1 in accordance with the present invention, when the drilling system 1 is used with a single rotary drilling apparatus. The drilling system 1 has been primarily assembled, such that the wings 300 have been installed in the guide device 200, and the driver 100 has been axially engaged in the guide device 200, and secured within the guide device 200 by retaining pins 401. Then, the drilling system assembly is connected to a DTH hammer (not shown) or any suitable device (e.g., a drilling rod) by the upper end 2 of the driver 100. Once the drilling system 1 is assembled, the drilling system 1 engages a casing 500 which will be driven down a hole to be drilled by operating the drilling system 1.

Figure 57:
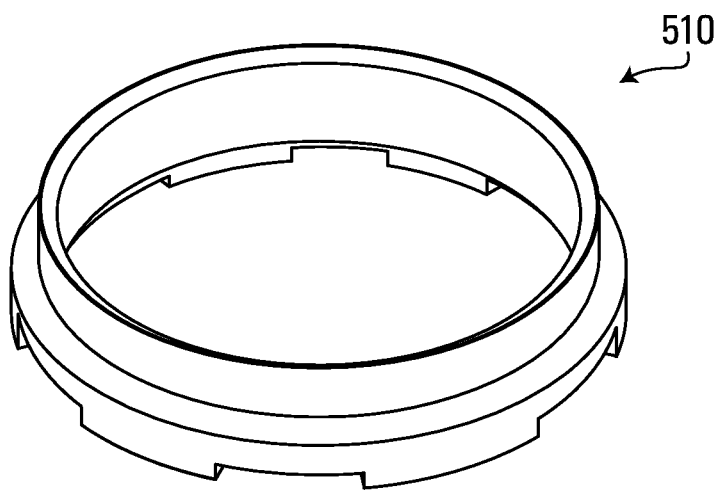
FIG. 57 shows a perspective view of an example of an abutment ring for mounting on a casing.

With reference to FIG. 29, the drilling system 1 is engaged at one end of a casing 500. The casing has a generally circular geometry (i.e. cylindrical) and has an inner diameter Dc1 and an outer diameter Dc2. The way an operator of the drilling system 1 engages said drilling system 1 in the casing 500 is not necessary to understand how the drilling system can operate. Suffice to say that the drilling system 1 is engaged at one end of the casing 500, which includes an abutment ring 510 (also known as an abutment crown), as shown in FIG. 57, mounted (e.g. welded), or integrally part of the casing, at an opposite end of the casing 500 (e.g. bottom end of the casing 500). In this embodiment, the shoulder 230 of the guide device 200 may abut against the abutment ring 510 when the drilling system 1 reaches the bottom end of the casing 500 and while drilling occurs. In practice, since the shoulder 230 abuts against the abutment ring 510 during drilling, the casing 500 can be driven down the hole by the drilling system 1 as it descends in the hole, i.e. the drilling system 1 drills the hole and drives down the casing 500 simultaneously in the hole. The friction between the abutment ring 510 and the shoulder 230 imparted by the drilling system 1 being pushed against the abutment ring 510 may allow the driver 100 and the guide device 200 to lock and unlock from one of the locking positions of the bayonet connection. The guide device 200 is thus frictionally maintained stationary while the driver 100 twists, for instance to unlock from one of the locking positions, inside the guide device 200.

Since the outer diameter D1 of the upper section 210 of the guide device is substantially equal to the inner diameter Dc1 of the casing 500, the upper section 220 of the guide device 200 can slidably engage the casing 500.

While the drilling system 1 is engaged within the casing 500, as shown in FIG. 29, the drilling system 1 can be arranged in the first drilling configuration as described above, such that the drilling system 1 can rotate while longitudinally moving within the casing 500 in order to clean the interior of the casing 500, or for any other purposes, without risking to jam the wings 300 (as a result of the wings 300 deploying due to centrifugal force or mechanical engagement) in the casing 500.

Once the shoulder 230 of the guide device 200 abuts against the abutment ring 510 at an end of the casing 500 (as shown in FIGS. 30 and 31), a substantial portion of the bottom section 220 of the guide device 200 clears the casing 500, such that wings 300 can then be deployed in their extended position.

With reference to FIGS. 30 and 31, the drilling system 1 unlocks from the first locking position by turning the driver 100 relative to the guide device 200 in a counterclockwise direction, to unlock the bayonet connection and disengage the locking mechanism of the wings 300. After unlocking from the first locking position, the drilling system 1 can move to the second axial position, and then twists in a clockwise direction relative to the guide device 200 to lock the bayonet connection in the second locking position. While the drilling system 1 is in the second drilling configuration (as shown in FIG. 30) and the wings 300 are extended, a bore size B of the drilling system 1 is slightly larger than the outer diameter Dc2 of the casing 500.

Where the drilling system 1 is in the second drilling configuration and the wings 300 are extended, drilling can occur. Once drilling is completed, for instance when the casing 500 is completely or substantially positioned into the ground, the operator can activate the drilling rod (not shown) in a counterclockwise direction, so that the driver 100 turns relative to the guide device 200 and consequently unlock from the second locking position. The driver 100 can then axially move within the guide device 200 from the second axial position to the first axial position. As the driver 100 progressively moves towards the first axial position, the guiding surface 125 of the enlargement 104 of the driver 100, frees the rear surface 350 of the wings 300, thereby allowing the wings 300 to pivotally retract in the apertures 250. The wings 300 may generally retract simply by the effect of gravity, for instance when the hole is being drilled vertically. Alternatively, by pulling the drilling system 1 out from the casing 500, the outer surface 310 of the wings 300 may abut against the abutment ring 510, such that the wings 300 are biased inwardly by the abutment ring 510 pressing against the outer surface 310 of the wings 300.

A practical advantage of having wings 300 that may pivot for retracting and extending from the guide device 200 is that the wings 300 can uneffortlessly retract by themselves (e.g. only by the effect of gravity), or almost uneffortlessly (e.g. with nominal force applied on the outer surface of the wings 300 by the abutment crown 510 to bias the wings 300 inwardly to retract). For instance, if desired, after retracting the wings 300 and while the driver is in the first axial position, the operator can then activate the drilling rod in a clockwise direction to turn the driver 100 relative to the guide device 200, which is still abutting against the abutment ring 510, thereby configuring the drilling system 1 in the first drilling configuration.

If for any reasons the operator desires to pull the casing 500 out of the drilled hole, the drilling system 1, configured in the second drilling configuration, can be used for this purpose. In this case, while the drilling system 1 is in the second drilling configuration, the wings 300 are locked in their extended position, and thus by pulling the drilling system 1 upwardly from the bottom of the hole, the outer surface 310 of the wings 300 may abut against the abutment ring 510, thereby causing the drilling system 1 to pull the casing 500 out of the hole.

The drilling system 1 may also be used with a dual rotary drilling apparatus. The operation of the drilling system 1 with a dual rotary drilling apparatus is similar to what was discussed above with respect to operation with a single rotary drilling apparatus, but some differences are discussed below.

When using the drilling system 1 with a dual rotary drilling apparatus, the casing 500 rotates and serves itself as a device to drill the hole while drilling concurrently with the drilling system 1 inside the casing 500. More particularly, the casing 500 may rotate in the counterclockwise direction (i.e. the dual rotary drilling apparatus can make the casing 500 rotate) while the drilling system 1 in the casing 500 is drilling in the clockwise direction.

Figure 58:
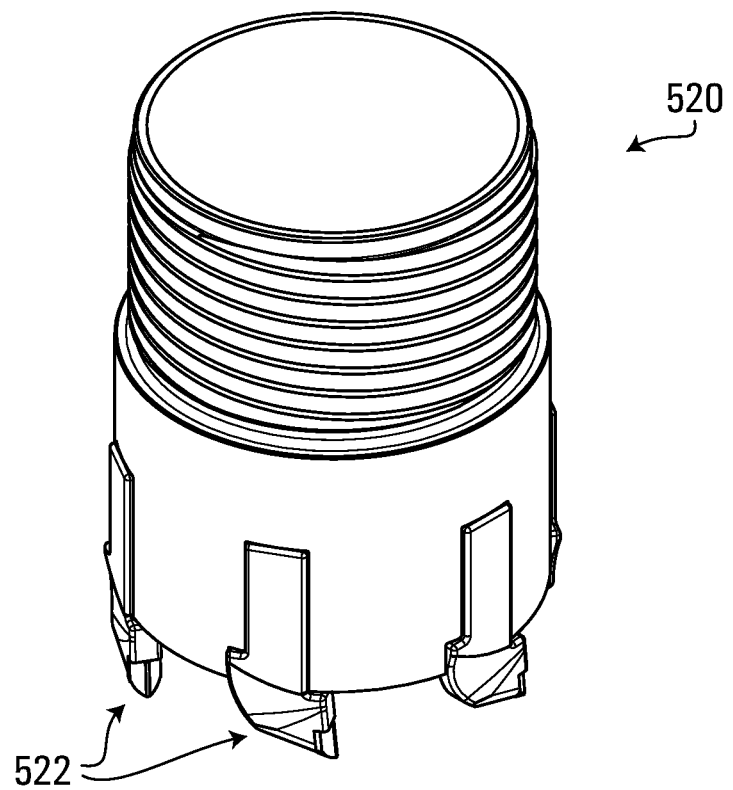
FIG. 58 shows a perspective view of an example of a casing crown mountable on a bottom end of a casing.
Figure 59:
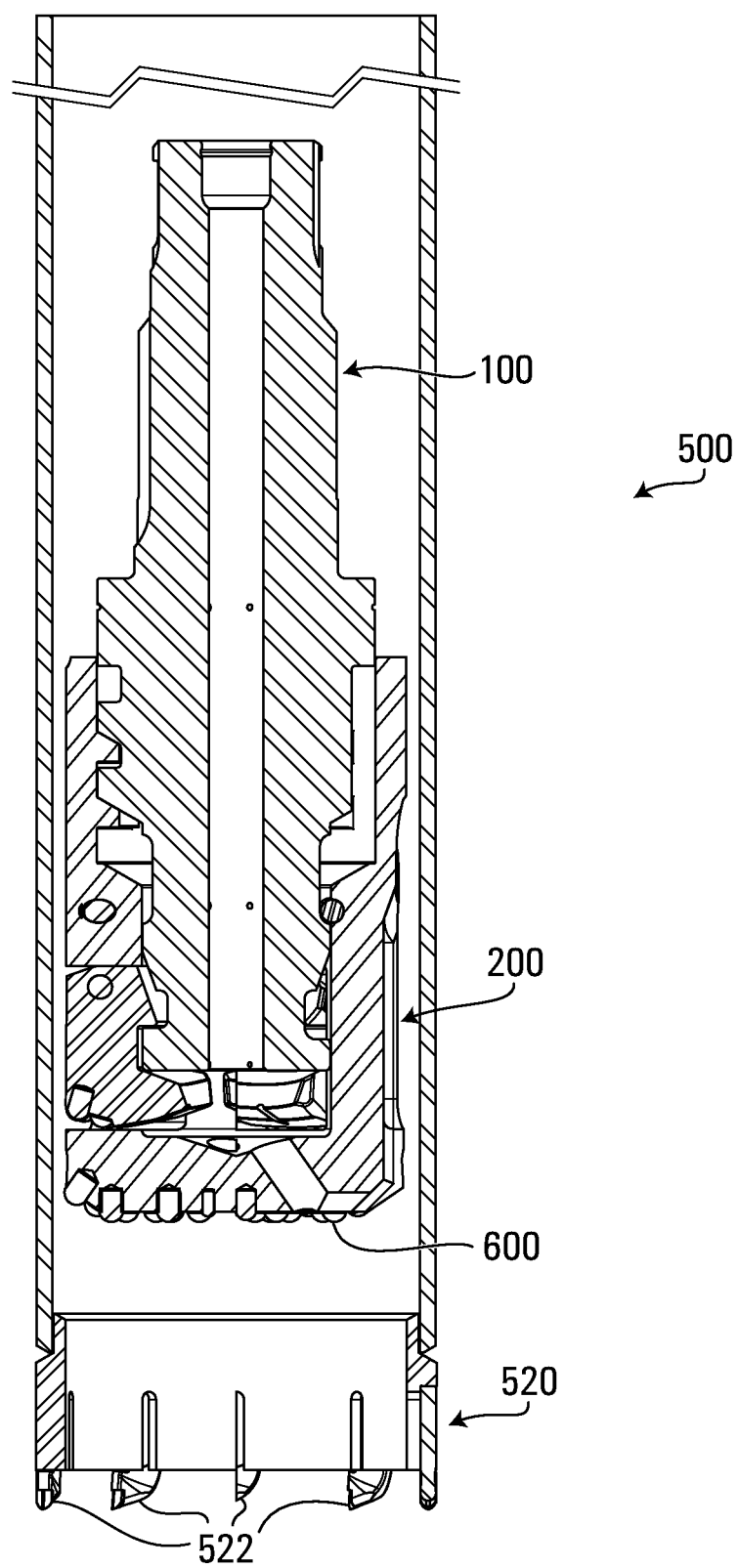
FIG. 59 shows a sectional view of the drilling system shown in FIG. 39, shown within a casing, the wings of the drilling system being in a retracted position and locked, the section being taken along the longitudinal axis of the drilling system, and a casing crown as shown in FIG. 58 being mounted to the bottom end of the casing.

In such case, as shown in FIG. 59, a casing crown 520 is mounted (e.g. welded, screwed or otherwise fastened) at an end of the casing 500 (i.e. at the bottom end of the casing 500). As shown in FIG. 58, the casing crown 520 comprises a series of projections 522 (e.g. teeth) along its circumference that may dig into the ground as the casing 500 rotate. The shape of the casing crown 520 and projections 522 thereof allows the casing 500 to descend in the ground while the casing crown 520 is digging into the ground. Also, when operated with a dual rotary drilling apparatus, the casing crown 520 may not limit the relative position of the casing 500 and the drilling system 1, as the drilling system 1 may not abut against the casing crown 520, as opposed to the abutment ring 510 discussed above with respect to the operation of the drilling system 1 with a single rotary drilling apparatus.

While the casing 500 is descending, it fills up with soil (a soil core builds up inside the casing 500). During this operation, the drilling system 1 remains inside the casing 500 and drills through the soil (e.g. overburden) filling up the casing 500.

A practical advantage of using the drilling system 1 while drilling a hole and installing the casing 500 this way is that this may help to reduce compressed air (or other fluids and/or mixtures, for instance water, drilling foam, chemical products) loss in the ground, as the compressed air used during drilling may remain substantially inside the casing 500 before being ejected upwardly through the sludge discharging grooves 240 of the guide device 200 with debris. This may ultimately avoid, or at least substantially reduce, a pressure build-up imparted to the ground due to compressed air (or other fluids) used during drilling.

Once a boulder or rock is hit during drilling, the drilling system 1 may move forward inside the casing 500 and may drill in the first drilling configuration (as discussed above) until the boulder or rock is crushed or the path for the casing 500 is cleared.

Alternatively, the casing 500 may be pulled up to clear at least the bottom section 220 of the guide device 200, such that the wings 300 can be deployed in their extended position, thereby allowing the drilling system 1 to drill in the second drilling configuration (as discussed above).

In this embodiment, the guide device 200 may be devoid of the shoulder 230 and as such, $D_2$ may be equal to or greater than $D_1$ to allow a clearance around a remaining portion of the guide device 200 and effectively allow the drilling system 1 to descend into the ground.

Another practical advantage of the drilling system 1 is the ability to transform its configuration to be used as a drill bit or as an under reamer at will. For instance, in some cases, it may be desirable to drill a "socket" in the ground underneath the bottom end of the casing 500 once it has reached a required depth in the ground (e.g. when the casing 500 reaches a bedrock at a given depth in the ground). A socket may be generally defined as a void (e.g. empty space) that may be filled with concrete or other structural material (e.g. cement) to immobilize or at least solidify the bottom end of the casing 500 in the ground.

The socket may have various sizes and shape. For instance, in this embodiment, the socket may have a size that is no greater than (e.g., equal to) $D_{C1}$. In other embodiments, the socket may have a bore size at least as large as (i.e. as large as or larger than) the outer diameter Dc2 of the casing 500.

The drilling system 1 may be used to drill the socket. For instance, once the casing 500 has reached a required depth in the ground, the drilling system 1 may drill the socket in the first drilling configuration or in the second drilling configuration as discussed above. In cases where a socket with a bore size larger than the outer diameter Dc2 of the casing 500 is necessary, the drilling system may first drill in the first drilling configuration until a given depth (e.g. 12 inches) deeper than the bottom end of the casing 500 is reached. Then, the wings 300 may be deployed in their extended position (e.g. in the rock or in the overburden), thereby allowing the drilling system 1 to drill in the second drilling configuration to complete the socket with a bore size larger than the outer diameter Dc2 of the casing 500.

Although the examples of operation discussed above expose a drilling system 1 engaged in a casing 500 to drill a hole and simultaneously drive down a casing in the hole being drilled, it is to be understood that the drilling system 1 of the present invention can work without the presence of a casing 500 and/or abutment ring 510, i.e. the drilling system can be used to drill a hole without simultaneously driving a casing 500 down the hole. For instance, instead of using the abutment ring 510 of a casing 500 to lock and unlock the driver 100 from one of the locking positions and to retract or extend the wings 300, the guide device 200 may simply be in friction relationship with the ground, or otherwise, to maintain the guide device 200 stationary relative to the driver 100.

With reference to FIG. 39 to 56, there is shown another embodiment of the drilling system 1 according to the present invention. In this embodiment, the drilling system 1, works similarly as discussed above. As such, the features of the drilling system 1 according to this embodiment that are similar to features previously discussed with respect to the drilling system 1 of the previously-presented embodiment will not be further discussed, but for the differences that are discussed below.

In this embodiment, the wing locking mechanism at the lowermost portion of the lower section 102 of the driver 100 includes three radial projections 130 configured to interact with a notch 340 formed at an inner surface 320 of each of the wings 300. Each of the radial projections 130 are configured to register in a corresponding notch 340 on each one of the three wings 300. In this embodiment, the wing locking mechanism has a different shape than as previously discussed. More particularly, the lowermost portion of the lower section 102 of the driver 100 includes an enlargement 134 that is configured to contact a rear surface 372 of the wings 300 when the drilling system 1 is in the second drilling configuration (discussed above). As such, the wing locking mechanism may not serve only for locking the wings 300 in the retracted position, but may also provide an additional contact area between the driver 100 and the wings 300 while the drilling system 1 is in the second drilling configuration. This may help to further distribute the drilling loads within the wings 300, the driver 100 and the guide device 200 during drilling in this drilling configuration.

In this embodiment, the wings 300 have a slightly different shape as that of the previously-presented embodiment. More particularly, as discussed above, each wing 300 includes a rear surface 372 at a lower end thereof that is configured to contact the enlargement 134 of the driver, as discussed above. Also, each wing 300 includes a bottom surface 374 underneath that is configured to contact a bottom surface of the aperture 250 in the guide device 200. This feature of the wing may help to further distribute drilling loads within the wings 300, the driver 100 and the guide device 200 during drilling in the second drilling configuration.

In some variants, where an abutment ring 510 or a casing crown 520 is used with the drilling system 1, the abutment ring 510 or the casing crown 520 may be configured to engage the wings 300 of the drilling system 1 when they are in their extended position, such as to prevent the guide device 200 from rotating relative to the driver 100 when the operator desires to unlock the wings 300 from the second drilling configuration and retract them. For instance, as shown in FIGS. 57 and 58 the abutment ring 510 and the casing crown 520 may include a series of recesses 524 on the circumference thereof that are configured to interlock with the extended wings 300. Once the extended wings 300 engage respective recesses on the casing crown 520 or abutment ring 510, the guide device 200 connected with the wings 300 is prevented from rotating relative to the casing crown 520 or abutment ring 510, thereby facilitating unlocking the bayonet connection of the driver 100 and the guide device 200, and in turn unlocking the drilling system 1 from the second drilling configuration.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A drilling system to drill a hole in the ground, the drilling system comprising:
    a first member;
    a second member; and
    a retention system comprising a connection to connect the first member and the second member in:
        a first locked position wherein the retention system retains the first member and the second member from substantially moving relative to one another along a longitudinal axis of the drilling system and in a first rotational direction of the drilling system, and wherein the first member and the second member can move relative to one another in a second rotational direction of the drilling system to disengage from the first locked position; and
        a second locked position wherein the retention system retains the first member and the second member from substantially moving relative to one another along the longitudinal axis of the drilling system and in the first rotational direction of the drilling system, and wherein the first member and the second member can move relative to one another in the second rotational direction of the drilling system to disengage from the second locked position.

2. The drilling system of claim 1, wherein the first member comprises a driver to drive the drilling system.

3. The drilling system of claim 1, wherein the second member comprises a guide device drivable by the first member.

4. The drilling system of claim 3, wherein the guide device comprises a drilling element to engage the ground.

5. The drilling system of claim 4, wherein the drilling element comprises an insert.

6. The drilling system of claim 5, wherein the insert comprises a button.

7. The drilling system of claim 6, wherein the button comprises a carbide button.

8. The drilling system of claim 1, wherein the first locked position and the second locked position are distant from one another along the longitudinal axis of the drilling system.

9. The drilling system of claim 1, wherein when in the first locked position, the first member and the second member are configured to be movable relative to one another to disengage from the first locked position and to engage into the second locked position.

10. The drilling system of claim 1, wherein when in the second locked position, the first member and the second member are configured to be movable relative to one another to disengage from the second locked position and to engage into the first locked position.

11. The drilling system of claim 1, comprising a retractable wing.

12. The drilling system of claim 11, wherein the retractable wing is configured to be retracted when the first member and the second member are in the first locked position.

13. The drilling system of claim 11, wherein the first member engages the second member to expand the retractable wing when the first member and the second member are in the second locked position.

14. The drilling system of claim 11, wherein the retractable wing is configured to radially expand a drilling span of the drilling system.

15. The drilling system of claim 11, wherein the retractable wing is a first retractable wing of a plurality of retractable wings.

16. The drilling system of claim 15, wherein the plurality of retractable wings comprises at least three retractable wings.

17. The drilling system of claim 1, wherein the connection comprises a bayonet connection.

18. The drilling system of claim 1, wherein the first member is capable of engaging the second member in the first rotational direction of the drilling system to impart rotation to the second member in the first rotational direction of the drilling system when the first member and the second member are in the first locked position.

19. The drilling system of claim 1, wherein the first member is capable of engaging the second member in axial directions of the drilling system to impart axial movement to the second member in axial directions of the drilling system when the first member and the second member are in the first locked position.

20. The drilling system of claim 1, wherein the drilling system is capable of engaging a casing to be driven down the hole simultaneously as the drilling system is drilling down the hole.

21. The drilling system of claim 20, wherein the casing includes a bottom end comprising an abutment ring.

22. The drilling system of claim 21, wherein the bottom end of the casing comprises a casing crown.

23. The drilling system of claim 20, wherein the drilling system is capable of being inside the casing.

24. The drilling system of claim 20, wherein the casing is configured to rotate as the hole is being drilled.

25. The drilling system of claim 24, wherein the casing is configured to participate into the drilling of the hole.

26. The drilling system of claim 25, wherein the casing is configured to rotate in a direction opposite to a rotating direction of the drilling system.

27. The drilling system of claim 26, wherein substantially all liquids introduced by the drilling system are evacuated within the casing.

28. The drilling system of claim 20, wherein the casing is configured to be rotationally stationary.

29. The drilling system of claim 1, wherein the second member comprises a retractable wing.

30. A drilling system to drill a hole in the ground, the drilling system comprising:
- a first member;
- a second member;
- a retention system comprising a connection to connect the first member and the second member in a first locked position wherein the retention system retains the first member and the second member from substantially moving relative to one another along a longitudinal axis of the drilling system and in a first rotational direction of the drilling system, wherein the first member and the second member can move relative to one another in a second rotational direction of the drilling system to disengage from the first locked position; and
- a retractable wing, wherein the retractable wing is configured to be retracted when the first member and the second member are in the first locked position.

31. A drilling system to drill a hole in the ground, the drilling system comprising:
- a first member;
- a second member;
- a retention system comprising a connection to connect the first member and the second member in a first locked position and a second locked position, wherein the retention system retains the first member and the second member from substantially moving relative to one another along a longitudinal axis of the drilling system and in a first rotational direction of the drilling system, wherein the first member and the second member can move relative to one another in a second rotational direction of the drilling system to disengage from the first locked position; and
- a retractable wing, wherein the retractable wing is configured to be retracted when the first member and the second member are in the first locked position and to be expanded when the first member and the second member are in the second locked position.

* * * * *